United States Patent
Hubbard et al.

(10) Patent No.: US 12,077,698 B2
(45) Date of Patent: Sep. 3, 2024

(54) LUMINESCENT NANOPARTICLE TRACERS, AND SYSTEMS AND METHODS FOR FABRICATION AND USE THEREOF

(71) Applicant: Battelle Memorial Institute, Richland, WA (US)

(72) Inventors: Lance R. Hubbard, Richland, WA (US); Ryan I. Sumner, Richland, WA (US); Nicolas E. Uhnak, Kennewick, WA (US); April J. Carman, Richland, WA (US); Martin Liezers, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 490 days.

(21) Appl. No.: 17/153,178

(22) Filed: Jan. 20, 2021

(65) Prior Publication Data

US 2021/0277304 A1    Sep. 9, 2021

Related U.S. Application Data

(60) Provisional application No. 62/964,250, filed on Jan. 22, 2020.

(51) Int. Cl.
*C09K 11/02*    (2006.01)
*C09K 11/56*    (2006.01)
(Continued)

(52) U.S. Cl.
CPC .......... *C09K 11/025* (2013.01); *C09K 11/565* (2013.01); *C09K 11/574* (2013.01);
(Continued)

(58) Field of Classification Search
None
See application file for complete search history.

(56) References Cited

U.S. PATENT DOCUMENTS

2011/0089375 A1    4/2011    Chan et al.
2015/0105284 A1    4/2015    Willson et al.
(Continued)

FOREIGN PATENT DOCUMENTS

CN    108998004 A    12/2018
KR    10-1519509 B1    5/2015

OTHER PUBLICATIONS

Hubbard et al. (Rugged nanoparticle tracers for mass tracking in explosive events). (Year: 2020).*

(Continued)

*Primary Examiner* — Ronak C Patel
(74) *Attorney, Agent, or Firm* — Klarquist Sparkman, LLP

(57) ABSTRACT

Ruggedized luminescent nanoparticle tracers have luminescent nanoparticle cores coupled to a luminescent substrate. The substrate is a large-particle size phosphor, while the nanoparticles are photoluminescent quantum dots (QDs) whose emission spectra can be tuned based on their chemical composition, size, and fabrication (e.g., dopants). The QDs are encapsulated by a protective layer to form a nanoparticle core. The protective layer can shield the QDs from external environments that would otherwise damage the delicate QDs. The substrate is also encapsulated by a protective layer, and the protective layer of the nanoparticle core is coupled to the protective layer of the substrate via a molecular linker to form a tracer particle complex. The tracer particle complexes can be disposed in a silicate suspension for subsequent use.

20 Claims, 8 Drawing Sheets
(4 of 8 Drawing Sheet(s) Filed in Color)

(51) Int. Cl.
| | |
|---|---|
| *C09K 11/57* | (2006.01) |
| *C09K 11/66* | (2006.01) |
| *C09K 11/77* | (2006.01) |
| *C09K 11/88* | (2006.01) |
| *G01N 21/64* | (2006.01) |
| *B82Y 15/00* | (2011.01) |
| *B82Y 20/00* | (2011.01) |
| *B82Y 40/00* | (2011.01) |

(52) U.S. Cl.
CPC ........ *C09K 11/662* (2013.01); *C09K 11/7745* (2013.01); *C09K 11/883* (2013.01); *G01N 21/6428* (2013.01); *B82Y 15/00* (2013.01); *B82Y 20/00* (2013.01); *B82Y 40/00* (2013.01); *G01N 2021/6439* (2013.01); *Y10T 428/2991* (2015.01)

(56) References Cited

U.S. PATENT DOCUMENTS

| | | |
|---|---|---|
| 2016/0141463 A1 | 5/2016 | Kurtin et al. |
| 2019/0081262 A1* | 3/2019 | Kim ........................ H10K 50/81 |

OTHER PUBLICATIONS

English abstract of Ha et al. (KR 20150091869) (Year: 2015).*
International Search Report and Written Opinion of the International Searching Authority for International Application No. PCT/US2021/014116, mailed Jul. 15, 2021 (8 pages).
Anderson et al., "Luminescent sensors for tracking spatial particle distributions in an explosion," *AIP Conference Proceedings*, Jan. 2017, 1793:060018. (5 pages).
Facebook post entitled, "Glowing cadmium-selenide quantum dots under blacklight," posted Sep. 3, 2019 by Pacific Northwest National Laboratory [retrieved on Feb. 22, 2021]. Retrieved from the Internet: <URL: https://www.facebook.com/PNNLgov/photos/a.10156841077349372/10156841084604372>. (1 page).
Facebook post entitled, "Gold Nano-Russian Doll Luminescence," posted Sep. 17, 2017 by Pacific Northwest National Laboratory [retrieved on Feb. 22, 2021]. Retrieved from the Internet: < URL: https://www.facebook.com/PNNLgov/photos/basw.AbqtTIXr8sX-XcIZNil6sQlp68vKPRtsoE95zmhvCRt0leDHdcTEXvs_kbjJ6BWWw3BzNnN1b7bEcL4jFtulk_KSHVpHJxo_RAEpNphSIZdEiyD2lg7D44qsylxjnj811aHgZ9p5tfS9YbwrvxL07NAo/10155127986719372/?opaqueCursor=Abrtfm7FYPaJltmP15Fhe_G3TfksHVJxAR9_p9dDaJbGiNINRfKI7UbrMZIIPmy9leetvmGuitJI041U9kaFV9Uxo5Q80g6k_wc6Do24IDU28h10liRFoBGJxgTr-MhrqaPKAlzl9wqB4n-uNzYliYYv_0gfAtES5OWcB9LBqXhMsUlaByGNin6ZzUmX23t0RBhyE7lkr_4MV4YjhVvtkYVTGVUUw6FqaYjUBpTOCqaBrqRUo3BPyvlg0Awl306Xns7_nBxYkdlrEZQpncjY99KErD5d2IGOYXSJV7eLW_0BdHYyB_ERxh3d6C2wB2gHshE3vpickedDimEid2z7ZFh7wqUDrA_ea8gT5D_-Z3Vn1F9qCak0EwliAKMWtEq7VNC723BkzxAcw9PFXjX_YmwVVFTJziSczH1NdZ8iQEoSxPaDMqC23xl7wA2fj4HahDio_kqUjpk_vXJJ76dhjOzoSqN-mVhnZfp2VG_wae9dsGmDEmKV38GLMUbkggujcFPHekxvjxR3CDLsA6wo_ZDAZ6m-K7ZU6sNmqvSKaFgZrAtlgVvup2t30ld4XxOdAhalZOrCRFVEFGPHh8DdlboxHjnORkpgVFMYkLiA8x7D_bBzNCwFUrl93CPj_9pSnXozUSmlbBCnMZ6OVIPaj7v6T3ILDx2ten3DFQOMrcf_vOYqVbDHzu3GyxCAVGEG92HCKTs3guBh6KUIX45qR4dsiOC7wBXAYydETla5OBdLZhlrC0M2h2idG57MwWf-J1Qw6po1dRCDSWohce5NHhT6M2Yz21_Jr5G6gjRylThOZIQtQuHIFlhCI5-x5vGftXycg4eMV0bHl-tsxhtJ7OaU>. (1 page).
Facebook post entitled, "High-speed image capture of a detonated stainless steel tube," posted Sep. 3, 2019 by Pacific Northwest National Laboratory [retrieved on Feb. 22, 2021]. Retrieved from the Internet: <URL: https://www.facebook.com/PNNLgov/photos/a.10156841077349372/10156841084589372>. (1 page).
Hubbard et al., "Project Goal for Rugged Nanoparticle Tracers for Mass Tracking in Explosive Events," Project Log on ResearchGate [online], Sep. 2018 [retrieved on Feb. 22, 2021]. Retrieved from the Internet: <URL: https://www.researchgate.net/project/Rugged-Nanoparticle-Tracers-for-Mass-Tracking-in-Explosive-Events>. (5 pages).
Hubbard et al., "Rugged nanoparticle tracers for mass tracking in explosive events," *15th International Conference and Exhibition on Materials Science and Engineering & the 3rd International Conference on Applied Crystallography*, Available via LinkedIn [online] Nov. 2018 [retrieved on Feb. 22, 2021]. Retrieved from the Internet: <URL: https://www.linkedin.com/in/lance-hubbard-54600745/detail/overlay-view/urn:li:fsd_profileTreasuryMedia:(ACoAAAIvAkYB8XvlpZ_zGwjwH_qeWkkqnlLlySo,1543430861555)/>. (28 pages).
Hubbard et al., "Rugged nanoparticle tracers for mass tracking in explosive events," *MRS Communications*, Oct. 2020, 10(4): pp. 594-599. (12 pages).
Manner et al., "Role of solvent-oxygen ion pairs in photooxidation of CdSe nanocrystal quantum dots," *ACS Nano*, 2012, 6(3): pp. 2371-2377. (7 pages).

* cited by examiner

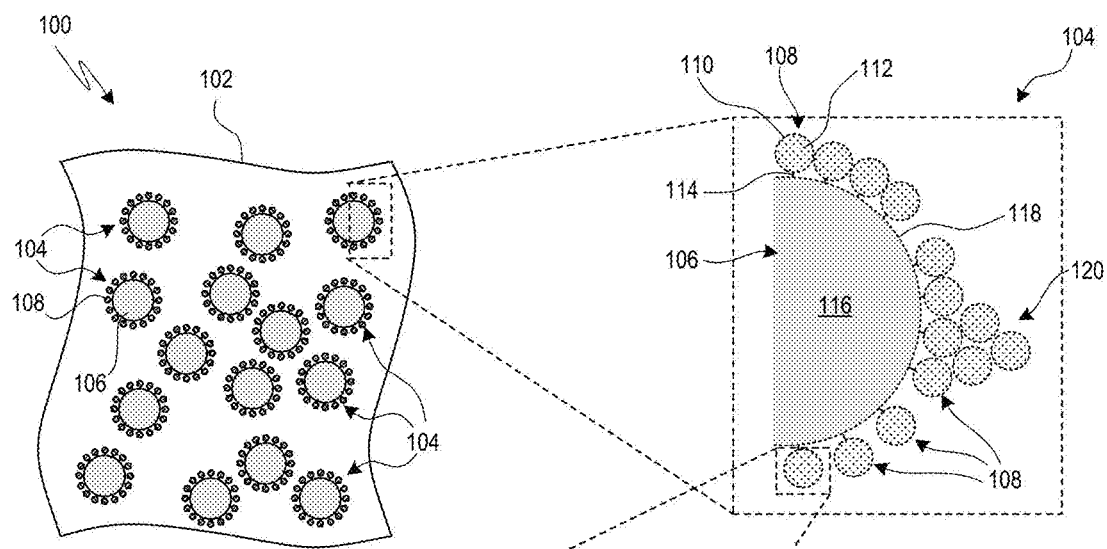
FIG. 1A
FIG. 1B
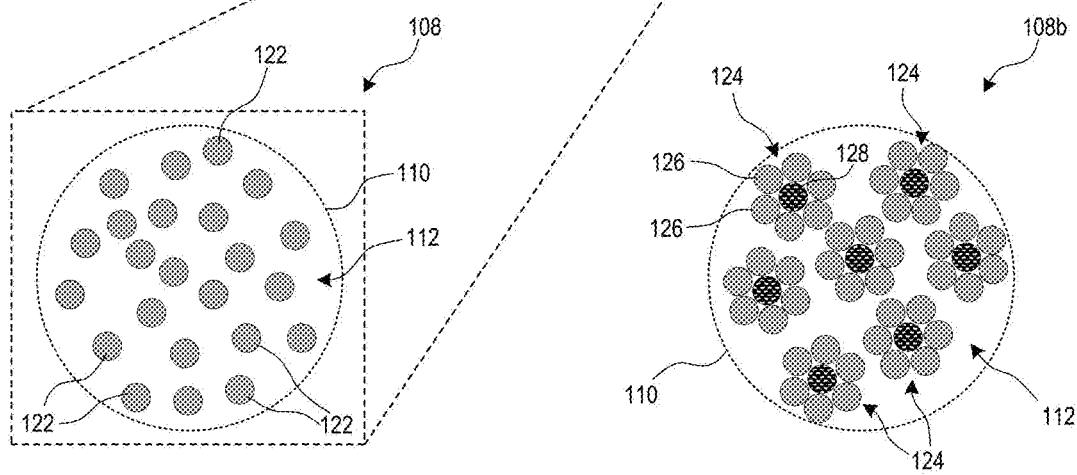
FIG. 1C
FIG. 1D

LUMINESCENT NANOPARTICLE TRACERS, AND SYSTEMS AND METHODS FOR FABRICATION AND USE THEREOF

CROSS REFERENCE TO RELATED APPLICATION

This application claims the benefit of U.S. Provisional Application No. 62/964,250, entitled "LUMINESCENT NANOPARTICLE TRACERS FOR PARTICULATE-FLOW TRACKING," filed Jan. 22, 2020, which is incorporated herein by reference in its entirety.

ACKNOWLEDGMENT OF GOVERNMENT SUPPORT

This invention was made with Government support under contract DE-AC05-76RL01830 awarded by the U.S. Department of Energy (DOE). The Government has certain rights in the invention.

FIELD

The present disclosure relates generally to particles for tracking, and more particularly, to luminescent nanoparticle tracers.

SUMMARY

Embodiments of the disclosed subject matter provide ruggedized luminescent nanoparticle tracers that can be used for particulate tracking and/or identification. The tracers can comprise luminescent nanoparticle cores coupled to a luminescent substrate. The substrate can be a large-particle size phosphor (e.g., strontium aluminate powder). The nanoparticles can be photoluminescent quantum dots (QDs) whose emission spectra depend on their chemical composition, size, and fabrication (e.g., dopants). The QDs can be encapsulated by a protective layer, for example, a silica shell, to form the nanoparticle core. The protective layer can shield the QDs from external environments that would otherwise damage the delicate QDs. The substrate can also be encapsulated by a protective layer. The protective layer of the nanoparticle core can be coupled to the protective layer of the substrate via a molecular linker to form a tracer particle complex. The tracer particle complexes can be disposed in a silicate suspension for subsequent use.

In one or more embodiments, a tracer can comprise a silicate suspension having therein a plurality of tracer particle complex. Each particle complex can comprise a photoluminescent substrate and a core. The photoluminescent substrate can be encapsulated by a first protective layer. The core can be coupled to the photoluminescent substrate. The core can comprise one or more photoluminescent quantum dots encapsulated by a second protective layer.

In one or more embodiments, a method can comprise providing a tracer on or in a structure. The tracer can comprise a silicate suspension having therein a plurality of tracer particle complexes. Each particle complex can comprise a photoluminescent substrate and a core. The photoluminescent substrate can be encapsulated by a first protective layer. The core can be coupled to the photoluminescent substrate. The core can comprise one or more photoluminescent quantum dots encapsulated by a second protective layer. The method can further comprise subjecting the structure with the tracer to a harsh environment. The method can also comprise irradiating the tracer with excitation radiation having a first wavelength and detecting resulting photoluminescence emitted by the tracer.

In one or more embodiments, a method of fabricating a tracer can comprise, by a first silication process, forming a first protective layer encapsulating a photoluminescent substrate. The method can further comprise, by a second silication process, forming a second protective layer encapsulating one or more photoluminescent quantum dots to form a core. The method can also comprise coupling the core to the photoluminescent substrate via the first and second protective layers to form a tracer particle complex. The method can further comprise disposing the tracer particle complex in a silicate suspension.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following description will proceed with reference to the accompanying drawings, which have not necessarily been drawn to scale. Where applicable, some elements may be simplified or otherwise not illustrated in order to assist in the illustration and description of underlying features. Throughout the drawings, like reference numerals denote like elements.

FIG. 1A is a simplified schematic diagram of a photoluminescent tracer, according to one or more embodiments of the disclosed subject matter.

FIG. 1B is a magnified view of a tracer particle complex of the photoluminescent tracer of FIG. 1A.

FIG. 1C is a magnified view of a core of the tracer particle complex of FIG. 1B.

FIG. 1D is a magnified view of an alternative configuration for quantum dots in a core of a tracer particle complex in a photoluminescent tracer, according to one or more embodiments of the disclosed subject matter.

DETAILED DESCRIPTION

General Considerations

Figure 2:
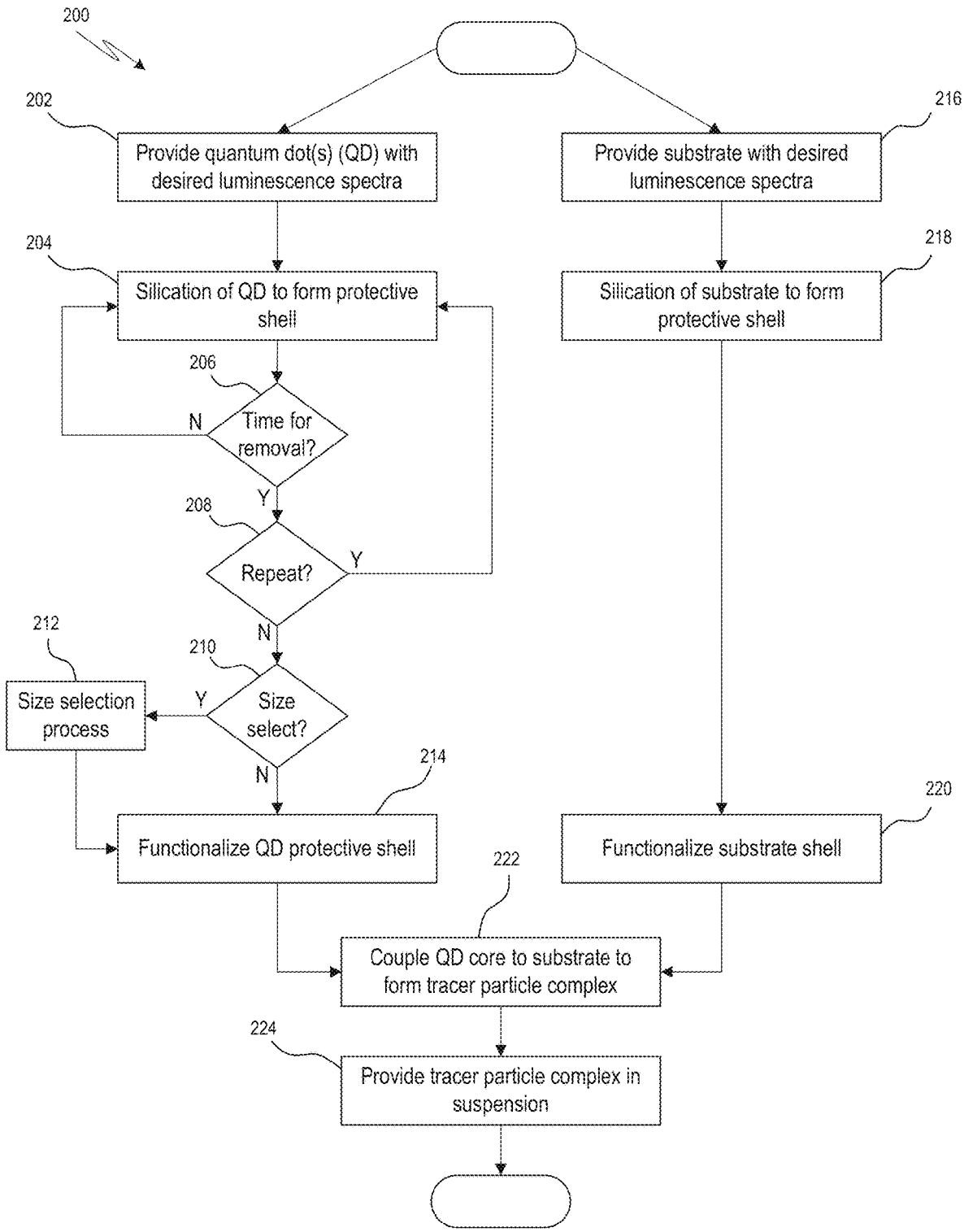
FIG. 2 is a process flow diagram for an exemplary method of fabricating a photoluminescent tracer, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inside," "outside,", "top," "bottom," "interior," "exterior," "left," "right," "front,"

"back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the appended claims.

Overview of Terms

Unless explained otherwise, all technical and scientific terms used herein have the same meaning as commonly understood to one of ordinary skill in the art to which this disclosure belongs. The following explanations of terms and abbreviations are provided to better describe the present disclosure and to guide those of ordinary skill in the art in the practice of the present disclosure.

Quantum dot (QD): Particles of a few nanometers in size (e.g., <10 nm in diameter) that exhibit photoluminescent emission due to quantum effects. In some embodiments, one or more QDs can be formed of semiconductor nanoparticles, for example, II-VI semiconductors such as zinc sulfide (ZnS) or cadmium selenide (CdSe). Alternatively or additionally, in some embodiments, one or more QDs can be formed of metal nanoparticles, for example, gold (Au) or copper (Cu). In some embodiments, one or more QDs can include a dopant molecule that changes the photoluminescent emission spectra of the QDs. Exemplary dopants can include, but are not limited to, terbium (Tb), oxygen (O), manganese (Mn), lead (Pb), samarium (Sm), europium (Eu), copper (Cu), dysprosium (Dy), boron (B), cerium (Ce), praseodymium (Pr), neodymium (Nd), magnesium (Mg), or any combination thereof.

Core: One or more QDs encapsulated (partially or fully encapsulated) by a protective layer. In some embodiments, the protective layer comprises a silica shell. Appropriate control of the fabrication process can generate cores (or agglomerations of cores) with diameters in a range of 200 nm to 5 µm.

Substrate: A phosphor having a particle size at least an order of magnitude greater than the QDs (e.g., having a diameter on the micron scale, such as ≥ 1 µm). In some embodiments, an excitation wavelength for causing photoluminescence of the phosphor is different than an excitation wavelength for causing photoluminescence of the QDs coupled thereto. Alternatively or additionally, in some embodiments, the excitation wavelengths of the phosphor and the coupled QDs are the same. In some embodiments, the phosphor comprises an aluminate, such as strontium aluminate ($SrAl_2O_4$) or a silicon-modified strontium aluminate (e.g., $SrAl_{11}Si_{0.75}O_{19}$). In some embodiments, the phosphor can include a dopant molecule that changes the photoluminescent emission spectra of the phosphor. Exemplary dopants can include, but are not limited to, Tb, O, Mn, Pb, Sm, Eu, Cu, Dy, B, Ce, Pr, Nd, Mg, or any combination thereof.

Tracer particle complex: One or more cores coupled to a substrate. In some embodiments, the protective layer of each core is coupled to the protective layer of the substrate via a molecular linker.

Molecular linker: A molecule that couples a core of one or more QDs to the substrate. In some embodiments, the molecule forms one or more chemical bonds (e.g., ionic bond, covalent bond, etc.) between a thiol-terminated ligand of the core (e.g., a protective shell surrounding the one or more QDs) and an amine-terminated ligand of the substrate (e.g., a protective shell surrounding the substrate). Alternatively, in some embodiments, the molecule forms one or more chemical bonds (e.g., ionic bond, covalent bond, etc.) between an amine-terminated ligand of the core (e.g., a protective shell surrounding the one or more QDs) and a thiol-terminated ligand of the substrate (e.g., a protective shell surrounding the substrate). For example, in some embodiments, the molecular linker comprises an amine-to-sulfhydryl crosslinker, such as sulfosuccinimidyl 4-[N-maleimidomethyl] cyclohexane-1-carboxylate (sulfo-SMCC).

Couple, coupling, or coupled: Refers to two or more constituent components that are physically or chemically joined together, either directly or indirectly. In some embodiments, components are directly coupled together by virtue of one or more chemical bonds (e.g., ionic bond, covalent bond, etc.) between molecules, for example, using a molecular linker between ligands. Alternatively or additionally, in some embodiments, components are indirectly coupled together by one or more chemical bonds between molecules of one or more intervening components. For example, a core can be coupled to a substrate by bonding between molecules of their corresponding protective shells and a molecular linker.

Silicate suspension: A heterogenous mixture of a fluid (such as water) and silicate particles. In some embodiments, the mixture may have the consistency of a gel. Alternatively, in some embodiments, some, most, or all of the fluid may be removed to provide a more solid consistency. For example, in some embodiments, the silicate particles can comprise a sodium silicate, such as sodium metasilicate ($Na_2SiO_3$, also known as waterglass). For example, the suspension can contain silicated particles in water and sodium metasilicate with a concentration from 0 to 1.1 g/ml (e.g., 0.22 g/ml). In some embodiments, the suspension initially has a viscosity similar to that of water, and transforms into a gel or solid after exposure to a harsh environment (e.g., explosion).

Gel: A colloidal system comprising a solid three-dimensional network within a liquid. By weight, a gel is primarily liquid, but can behave like a solid due to a three-dimensional network of entangled and/or crosslinked molecules of a solid within the liquid. From a rheological perspective, a gel has a storage modulus $G'$ value which exceeds that of the loss modulus $G''$. The storage modulus is a measure of the energy stored in a material in which a deformation (e.g., sinusoidal oscillatory shear) has been imposed; storage modulus can be thought of as the proportion of total rigidity of a material that is attributable to elastic deformation. The loss modulus is a measure of the energy dissipated in a material in which a deformation (e.g., sinusoidal oscillatory shear) has been imposed; loss modulus can be thought of as the proportion of the total rigidity of a material that is attributable to viscous flow rather than elastic deformation. The storage modulus and loss modulus can be determined with a rheometer.

Silication process: The fabrication process used to form a silica-based protection layer that encapsulates QDs or a substrate (also referred to herein as silicated QDs or silicated substrates). In some embodiments, the silication process comprises a modified Stöber process, where silica precursor tetraethyl orthosilicate (TEOS) is hydrolyzed in alcohol (e.g., ethanol) using ammonium hydroxide as a catalyst. In some embodiments, a reagent to prepare thiol functionalized materials can be added to the alcohol prior to or with introduction of the TEOS. For example, the reagent can be an organosilane such as 3-mercaptopropyl trimethoxysilane (MPTMS). In some embodiments, the silication process may be repeated multiple times to increase a size of the encapsulating protective layers (and thereby a size of the core or substrate) and/or to cause agglomeration of the encapsulating protective layers (e.g., to form larger clusters of cores). Alternatively or additionally, in some embodiments, the timing of the silication process (e.g., time of TEOS addition, reaction time after introduction of the catalyst) can be used to obtain a desired particle size for the resulting encapsulate core or substrate.

Harsh environment: An environment having a temperature, pressure, and/or pH that would otherwise degrade photoluminescent properties of unprotected quantum dots. In some embodiments, a harsh environment comprises conditions associated with an explosion. Alternatively or additionally, in some embodiments, a harsh environment comprises a temperature of at least 75° C., a pressure of at least 50 MPa, a pH less than or equal to 2 or greater than or equal to 12, or any combination thereof.

Introduction

Disclosed herein are ruggedized luminescent nanoparticle tracers, methods for fabrication of such tracers, and methods and systems for use of such tracers. The nanoparticle tracers can have luminescent nanoparticle cores coupled to a luminescent substrate. The substrate can be a large-particle size phosphor, while the nanoparticles in the core can be photoluminescent quantum dots (QDs) whose emission spectra depend on their chemical composition, size, and fabrication (e.g., dopants). The QDs are encapsulated by a protective layer, for example, a silica shell, to form the nanoparticle core. The protective layer shields the QDs from external environments that would otherwise damage the delicate QDs. The substrate is encapsulated by a separate protective layer. The nanoparticle core and the substrate can be coupled together via a molecular linker between their respective protective layers to form a tracer particle complex. In some embodiments, tracer particle complexes can be disposed in a silicate suspension for storage and/or subsequent use.

The protective layer can allow the tracer particle complex to tolerate exposure to harsh environments (e.g., temperatures, pressures, and hot gases typically experienced in an explosive environment, or acidic/basic environments). For example, when exposed to harsh environments, the protective layer can act as a sacrificial layer to ensure post-exposure photoluminescent operation of the QD and/or the substrate. The silicate suspension may also offer a protective function to the tracer particle complexes, for example, by absorbing energy from the environment that would otherwise be directly transmitted to the core and substrate. The protective layer also allows for micron-scale particle size tuning of the nanoparticle cores.

In some embodiments, the tracers can be incorporated into a paint, coating, seal, glue, epoxy, etc. that is applied to a surface of a structure of interest. Alternatively or additionally, in some embodiments, the tracers can be disposed within a structure of interest, for example, by incorporating into a cement or plastic precursor used to form the structure. Alternatively or additionally, in some embodiments, the tracers can be disposed within a fluid, for example, to track movement of the fluid. By providing the disclosed tracers in (or on) structures or environments of interest, valuable information on the mass distribution during flow events can be obtained, which information can aid in the development or confirmation of transport modeling. In some embodiments, the disclosed tracers can allow for tracking of mass through time and space, and/or provide identification of an origin of the mass based on its unique photoluminescent signature. For example, mass distribution can be traced based on detected emission signatures by employing multiple tracer particle complexes with different emission spectra and particle size. Applications for the disclosed tracers can include, but are not limited to, debris tracking in explosions, fracking fluid identification, identity and verification of seals (e.g., leak detection), and structure tagging.

Luminescent Nanoparticle Tracer Embodiments

FIG. 1A shows an exemplary configuration for a photoluminescent nanoparticle tracer 100. The tracer 100 includes a plurality of tracer particle complexes 104 disposed in a suspension 102. In some embodiments, the suspension 102 comprises a silicate gel, such as sodium metasilicate (e.g., waterglass). Each tracer particle complex 104 includes one or more photoluminescent nanoparticle cores 108 coupled to a photoluminescent substrate 106. In some embodiments, each of tracer particle complexes 104 in the suspension 102 can be substantially the same with respect to material composition, particle size, and/or emission spectra. Referring to the detailed view of FIG. 1B, the substrate 106 of each tracer particle complex 104 is formed by a large phosphor 116 (e.g., a phosphorescent powder, such as strontium aluminate) encapsulated by a first protective layer 118. The phosphor 116 provides the photoluminescent properties of the substrate 106. Similarly, each core 108 of each tracer particle complex 104 is formed by a plurality of nanoparticles 112 encapsulated by a second protective layer 110. Referring to the detailed view of FIG. 1C, the plurality of nanoparticles 112 in each core 108 comprises a plurality of QDs 122, which provide the photoluminescent properties of the core. The first protective layer 118 and the second protective layer 110 can be formed of a material that is substantially transparent or translucent with respect to emission and excitation wavelengths of the QDs 122 and the phosphor 116, thereby allowing the tracer particle complex 104 to exhibit photoluminescent properties of its constituent materials despite being encapsulated by the protective layers. For example, in some embodiments, first protective layer 118 and/or second protective layer 110 comprises a silica shell, or a shell formed of another transparent or translucent inorganic material.

The core(s) 108 and the substrate 106 can be coupled to each other through their respective protective layers 110, 118. In some embodiments, a molecular linker bonds to ligands of the protective layers 110, 118, thereby coupling the core 108 to the substrate. For example, in some embodiments, the molecular linker (e.g., an amine-to-sulfhydryl crosslinker, such as sulfo-SMCC) covalently bonds to amine-terminated ligands and thiol-terminated ligands functionalized on the protective layers 110, 118. The first protective layer 118 of the substrate 106 can have the amine-terminated ligand and the second protective layer 110 of the core 108 can have the thiol-terminated ligand, or vice versa.

The protective layer 110 can shield the QDs 122 of the core 108 from harsh environments that would otherwise degrade the photoluminescent properties of the QDs. In some embodiments, the protective layer 110 comprises a porous silica shell that is soaked in water. Thus, when subjected to a high temperature environment such as that experienced during an explosive event, water loaded in the pores of the silica shell helps mitigate temperature rise, since all of the water has to be driven from the protective shell before the temperature of the core 108 can exceed the boiling point of water. In some instances, the silica shell can act as a sacrificial layer, degrading in response to environmental exposure in order to preserve the photoluminescent properties of the QDs 122 or phosphor 116 contained therein. The provision of the suspension 102 may also offer some protection to the tracer particle complexes 104 from exposure to harsh environments. In some embodiments, the suspension 102 comprises a sodium metasilicate gel. Since the sodium metasilicate gel is endothermic, it is able to absorb energy from an explosive event, which energy would otherwise impact the QDs 122. Without being bound by any particular theory, it is believed that, during a high explosive (HE) event, gas expansion resulting from the HE event do not provide sufficient time for the silicate in the gel to equilibrate to the HE gases. The amount of heat released by the HE event can be on the same order of magnitude as energy to recrystallize metasilicate in the gel. Thus, the silicate absorbs at least some of the thermal energy of the HE event, thereby protecting the tracer particle complex from excessive heat.

In some embodiments, a tracer particle complex 104 can include an agglomeration 120 of cores 108 coupled to the substrate. For example, control of a fabrication process (e.g., by repeating a silication process) to form the second protective layer 110 around QDs 122 can result in the protective layers 110 of adjacent cores 108 collecting together to yield a larger particle size than just each core 108 alone. In this manner, particle sizes for the QD portion of the tracer particle complex 104 can be tailored to a particular application, for example, within a range of 200 nm to 5 µm. Other methods for tailoring the particle size of the QD portion of the tracer particle complexes are discussed further hereinbelow.

In some embodiments, at least some of the tracer particle complexes 104 in the suspension can be different from others in the suspension with respect to material composition, particle size, and/or emission spectra. For example, in some embodiments, the suspension 102 can include two different types of tracer particle complexes 104. The first complexes in the suspension 102 can have substrates providing a first emission spectra and cores of a first size providing a second emission spectra, while the second complexes in the suspension 102 can have substrates providing a third emission spectra and cores of a second size providing a fourth emission spectra. The first and/or second emission spectra can provide a unique photoluminescent signature associated with particles having the first size, and the third and/or fourth emission spectra can provide a unique photoluminescent signature associated with particles having the second size. In some embodiments, these unique signatures can be used to track mass flow from a common origin.

In some embodiments, different types of QDs can be included within each core, for example, to provide different photoluminescent properties and/or enhance ruggedness. For example, FIG. 1D shows an alternative core 108b that includes two different types of QDs 126, 128. The QDs can be organized into quantum dot assemblies 124, with outer QDs 126 surrounding inner QDs 128. In some embodiments, the outer QDs 126 may be more stable (e.g., with respect to photoluminescent properties) in a particular environment than the inner QDs 128, while the inner QDs 128 may have superior photoluminescent properties (e.g., higher brightness). Accordingly, the outer QDs 126 may serve to protect inner QDs 128 of the assemblies 124 in order to take advantage of the superior photoluminescence of the inner QDs 128. For example, QDs formed of ZnS are stable in air (e.g., oxygenated and/or polar environments) but have lower brightness as compared to QDs formed of CdSe. However, the CdSe QDs are less stable when exposed to air, with their photoluminescence decaying over time (e.g., having a usable shelf life on the order of days). The outer QDs 126 and the inner QDs 128 may thus be formed of ZnS and CdSe, respectively, with the ZnS QDs enhancing the stability of the CdSe QDs. In another example, the outer QDs 126 may be formed of ZnS, and the inner QDs 128 may be formed of any other QD that is less stable than ZnS in an anticipated environment (e.g., air), for example, a QD formed of a semiconductor or a metal (e.g., Au, Cu, etc.).

Fabrication Method Embodiments

FIG. 2 shows an exemplary method 200 for fabricating a photoluminescent tracer, such as tracer 100 of FIG. 1A. The method 200 can initiate with either a first processing branch for forming the nanoparticle cores (e.g., blocks 202-214) or a second processing branch for forming the substrate (e.g., blocks 216-220). Alternatively, the first and second branches can be performed separately at the same time or overlapping in time.

At process block 202, QDs having a desired luminescence spectra can be provided. In some embodiments, the provision of QDs can include fabricating the QDs from constituent materials. For example, for ZnS QDs, the fabrication can combine zinc acetate, sodium sulfide, a solvent, and/or a ligand together, such as described hereinbelow with respect to any of Examples 1 and 8. The provision of process block 202 can also include selecting a desired dopant for the QDs to provide a desired photoluminescent emission spectra. Alternatively or additionally, in some embodiments, the provision of QDs can include obtaining pre-fabricated QDs, for example, from a commercial source.

At process block 204, a silication process can be performed to form a protective layer (e.g., silica shell) encapsulating one or more of the QDs. For example, the silication process comprises a modified Stöber process, where silica precursor tetraethyl orthosilicate (TEOS) is hydrolyzed in alcohol (e.g., ethanol) using ammonium hydroxide as a catalyst. In some embodiments, the TEOS can be added gradually over time or at discrete time intervals, while in other embodiment the TEOS is added all at once at the beginning of the silication process. For example, the silication process can be as described below with respect to any of Examples 1, 5, 7, and 8.

The particle size of the resulting cores (e.g., protective-layer-encapsulated QDs) may be a function of reaction time of the silication process (e.g., as measured from introduction of the ammonium hydroxide catalyst), with longer reaction times generally resulting in larger particle sizes. Thus, in some embodiments, the reaction time can be monitored, and cores removed from the silication solution at a particular time corresponding to a desired particle size. Alternatively, in some embodiments, the reaction is continued until a predetermined stop time is reached. At decision block 206, it can be determined if such a time has been reached. If not, the method 200 returns to process block 204 to continue the silication process until the time is reached. Once the particular reaction time corresponding to desired particle size or the predetermined stop time has been reached at decision block 206, the reaction can be stopped by removing the cores from the solution.

The method 200 can then proceed to decision block 208, where it is determined if the silication process should be repeated. Repeating the silication process (e.g., with a new mixture of TEOS, alcohol, and catalyst) can act to increase effective particle size of the resulting cores, for example, by causing agglomeration of particles and/or further increasing the thickness of the encapsulating protective layer. If repetition of the silication process is desired at decision block 208, the method 200 can return to process block 204. Otherwise, the method 200 can proceed to decision block 210.

At decision block 210, it is determined if size selection of the cores is desired. For example, in some embodiments where the cores resulting from the silication have a range of particle sizes, the cores can be subject to a size selection process such that the selected cores are predominantly a single size or in a narrow size band (e.g., $<\pm 0.2$ µm). Thus, in subsequent use, the photoluminescence detected from the selected cores can be readily correlated with particle size of the cores. If the size selection is desired, the method 200 can proceed to process block 212, where a particle size selection process is performed. For example, the particle size selection process can include, for example, filtering, centrifugation, flow field-flow fractionation, sedimentation field-flow fractionation, any other particle size selection technique, or any combination of the above.

If size selection is not desired at decision block 210 or after the size selection process of process block 212, the method 200 can proceed to process block 214, where the protective layer encapsulating the QDs for each core is functionalized with a ligand for coupling to the substrate. In some embodiments, the silica shell can be functionalized with a thiol-terminated ligand (e.g., having HS termination). For example, the cores can be mixed with 3-mercaptopropyl trimethoxysilane (MPTMS) in ethanol to functionalize the silica shell of the cores, as described further below with respect to Example 1. Alternatively, in some embodiments, the silica shell can be functionalized with an amine-terminated ligand (e.g., having $NH_2$ termination).

At process block 216, a substrate having a desired luminescence spectra can be provided. In some embodiments, the provision of the substrate can include obtaining pre-fabricated phosphors, for example, from a commercial source. Alternatively or additionally, the provision of the substrate can include fabricating phosphors from constituent materials. For example, for strontium aluminate phosphor powders can be produced using conventional fabrication techniques. The provision of process block 216 can also include selecting a desired dopant for the phosphor and/or controlling the fabrication process (e.g., reducing atmosphere composition, stoichiometry of the reagents, etc.) to provide an a particular crystal structure, in order to provide a desired photoluminescent emission spectra.

At process block 218, a silication process can be performed to form a protective layer (e.g., silica shell) encapsulating the substrate. In some embodiments, the silication process for the substrate can be substantially similar to the silication process used in process block 204 for QDs. However, since controlling size of the substrate may be less of an issue in some embodiments, the TEOS may be added all at once at the beginning of the silication process of process block 218, and the reaction timing, the silication repetition, and/or the size selection noted for decision blocks 206-210 in the first processing branch may not be needed in the second processing branch. For example, the silication process of the substrate can be as described below with respect to Example 1.

After the silication process of process block 218, the method 200 can proceed to process block 220, where the protective layer encapsulating the substrate is functionalized with a ligand for coupling to the cores. In some embodiments, the silica shell can be functionalized with an amine-terminated ligand (e.g., having $NH_2$ termination). For example, the substrate can be mixed with 3-aminopropyl trimethoxysilane (APTMS) in ethanol to functionalize the silica shell of the substrate, as described further below with respect to Example 1. Alternatively, in some embodiments, the silica shell for the substrate can be functionalized with a thiol-terminated ligand (e.g., having HS termination).

After process blocks 214 and 220, the method 200 can proceed to process block 222, where the cores and the substrate are coupled together to form a tracer particle complex. In some embodiments, a molecular linker can be bonded (e.g., one or more chemical bonds, such as a covalent bond) between the amine-terminated ligand and thiol-terminated ligand of the respective protective layers to couple each core to the substrate. For example, sulfo-SMCC as a molecular linker can be mixed with the substrate in a solution in order to bond to the amine-terminated ligands of the substrate's protective shell, after which the substrate is mixed with the cores in a solution in order to further bond the thiol-terminated ligands of the cores' protective shells to the sulfo-SMCC, as described further below with respect to Example 1.

After process block 224, the method 200 can proceed to process block 224, where the tracer particle complexes are provided in a suspension to form the photoluminescent tracer. In some embodiments, the suspension comprises a gel, such as sodium silicate or sodium metasilicate. For example, the provision of the tracer particle complexes in suspension can be as described below with respect to Example 1. After process block 224, the photoluminescent tracer can be ready for use, for example, by applying to a structure or incorporating in a structure or fluid for particle tracking or identification.

Although blocks 202-224 of method 200 have been described as being performed once, in some embodiments, multiple repetitions of a particular process block may be employed before proceeding to the next decision block or process block. For example, aspects of the coupling of process block 222 may be performed multiple times in order to allow additional cores to bind to the substrate. Moreover, although FIG. 2 illustrates a particular order for blocks 202-224, respectively, embodiments of the disclosed subject matter are not limited thereto. Indeed, in certain embodiments, the blocks may occur in a different order than illustrated or simultaneously with other blocks.

Method of Use and System Embodiments

Figure 3:
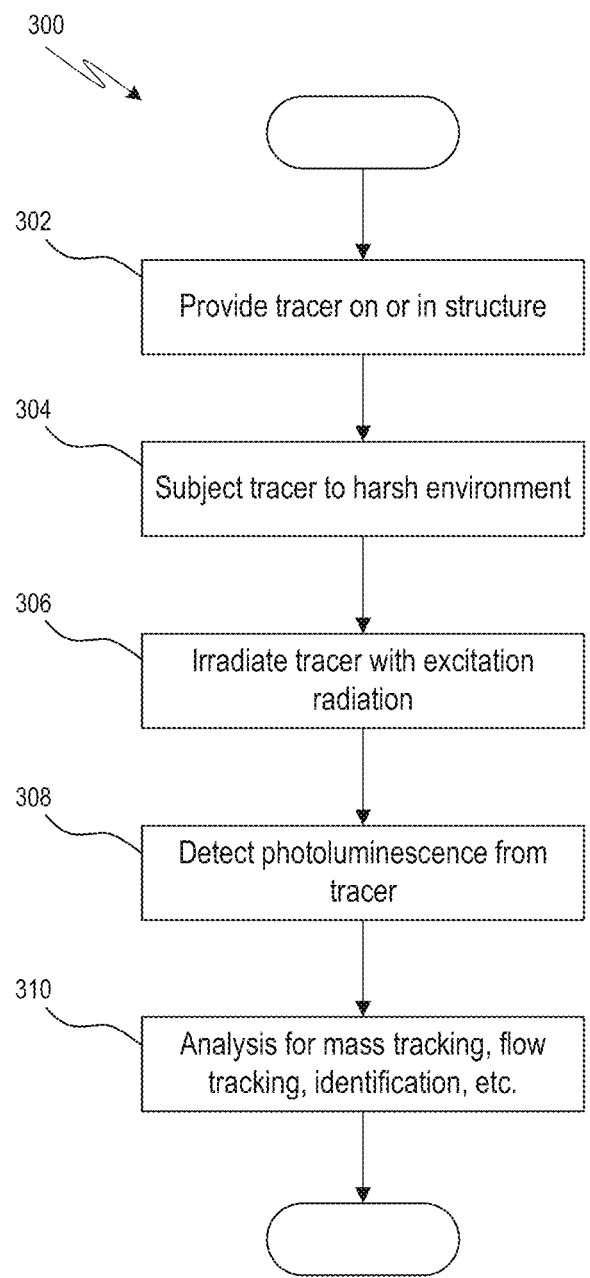
FIG. 3 is a process flow diagram for an exemplary method of using a photoluminescent tracer, according to one or more embodiments of the disclosed subject matter.

FIG. 3 shows an exemplary method 300 for use of a photoluminescent tracer, such as tracer 100 of FIG. 1A. The method 300 can initiate at process block 302, where the photoluminescent tracer is provided on a structure or in a structure. In some embodiments, the tracer can be incorporated into a paint, coating, seal, glue, epoxy, etc. that is applied to a surface of a structure of interest. Alternatively or additionally, in some embodiments, the tracer can be disposed within a structure of interest, for example, by incorporating into a cement or plastic precursor used to form the structure. Alternatively or additionally, in some embodiments, the tracers can be disposed in a fluid, for example, a fluid contained in or provided to a structure.

In some embodiments, photoluminescent tracers having a first emission spectra can be provided for a first structure, and other photoluminescent tracers having a second emission spectra (different from the first emission spectra) can be provided for a second structure. Identification of the origin of any detected particles is thus possible based on the unique emission spectral signatures. Alternatively or additionally, in some embodiments, photoluminescent tracers provided in or on a structure can have different QD core sizes. In such embodiments, the emission spectra for each QD core size can be different, thereby allowing the detected photoluminescent emission to be readily correlated to corresponding particle size for mass flow tracking.

The method 300 can proceed to process block 304, where the tracer is subjected to a harsh environment. In some embodiments, the harsh environment can be that resulting from detonation of an explosive. Alternatively or additionally, in some embodiments, the harsh environment can be a highly acidic (e.g., having a pH less than or equal to 2) or highly basic (e.g., having a pH greater than or equal to 12) environment. Alternatively or additionally, in some embodiments, the harsh environment can subject the tracer to a high temperature (e.g., greater than 75° C.) and/or high pressure (e.g., greater than 50 MPa). For example, in some embodiments, the harsh environment can be produced in fluid from a fracking process, fluid in a radiator or boiler, fluid in a hydraulic system, etc., or from atmospheric interactions (e.g., satellite or spacecraft re-entry, aerodynamic heating of aircraft, etc.).

At process block 306, the tracer is irradiated with excitation radiation. In some embodiments, the wavelength of the excitation radiation can be selected to excite photoluminescence in both the substrate and the cores of the tracer particle complex. For example, for substrates formed of strontium aluminate and cores formed of ZnS QDs, the wavelength of the excitation radiation can be 325 nm. Alternatively or additionally, in some embodiments, the wavelength of the excitation radiation can be selected to excite photoluminescence in either the substrate or the cores of the tracer particle complex. For example, the wavelength of the excitation radiation can be 405 nm in order to excite photoluminescence of a strontium aluminate substrate without exciting photoluminescence of ZnS QD cores. Alternatively or additionally, in some embodiments, the wavelength of the excitation radiation may be broad-band radiation (e.g., sunlight, white light, etc.) capable of exciting photoluminescence in one or both of the substrate and the cores of the tracer particle complex.

At process block 308, photoluminescence emitted from the components of the tracer particle complex (e.g., the substrate, the cores, or both) can be detected. In some embodiments, the spectra of the photoluminescence can be detected using a spectrometer. Alternatively or additionally, in some embodiments, the photoluminescence can be detected using an imaging array (e.g., a complementary metal-oxide semiconductor (CMOS) or charge-coupled device (CCD) detector), for example, to determine location of photoluminescent particles in an environment. In such embodiments, a bandpass or other optical filter can be used in combination with the imaging array to select an emission wavelength of interest, for example, to correspond to a peak wavelength emitted by QD cores of a particular size.

Alternatively or additionally, in some embodiments, a multi-color image detected by the imaging array can be digitally processed to separate colors therein. For example, the detected multi-color image can be processed to yield separate substantially-single-color images (e.g., narrow wavebands of the electromagnetic spectrum, such as red, green, and blue (RGB) images) or separate layers of a composite image. When the photoluminescent emission spectra of the QD cores is tailored based on particle size (e.g., such that different core sizes have different peak emission wavelengths), the separation of colors in the detected image can be used to map locations of different size particles within the image (and thus provide a measure of mass distribution). Other imaging and image processing techniques for correlating detected photoluminescence to particle size, particle mass, and/or particle location are also possible according to one or more contemplated embodiments.

At process block 310, an analysis of the detected photoluminescence can be performed. For example, in some embodiments, the analysis can determine mass distribution from a structure due to an explosion. In such embodiments, the structure may have been provided with tracers having QD cores of different sizes with unique photoluminescent signatures, such that the detected photoluminescent can be matched to the QD core particle size.

Figure 4A:
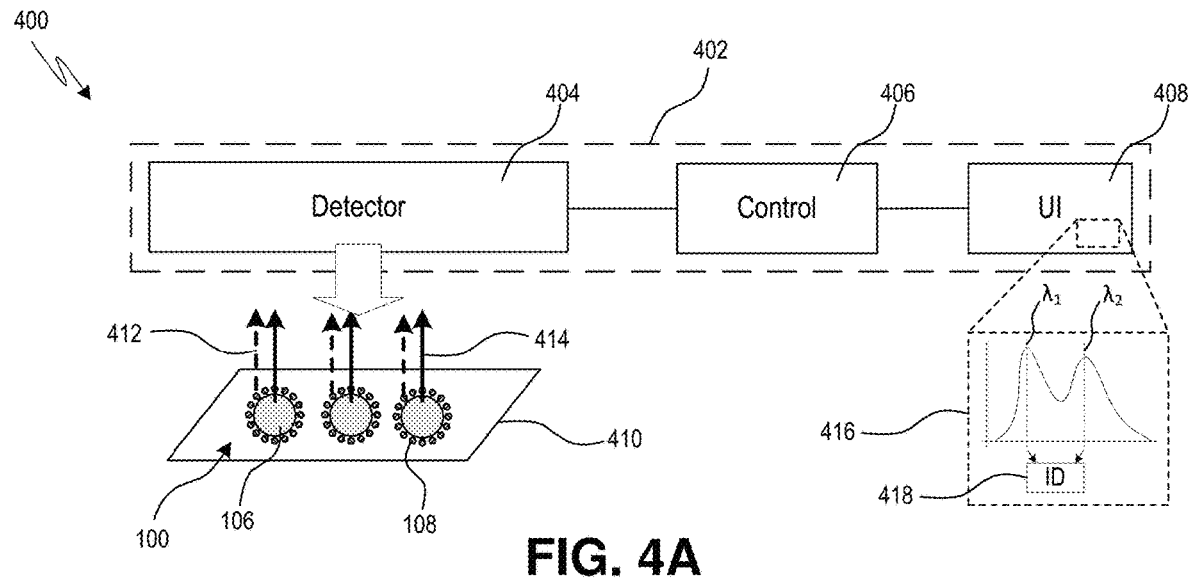
FIG. 4A is a simplified schematic diagram of an exemplary detection setup employing photoluminescent tracers, according to one or more embodiments of the disclosed subject matter.
Figure 4B:
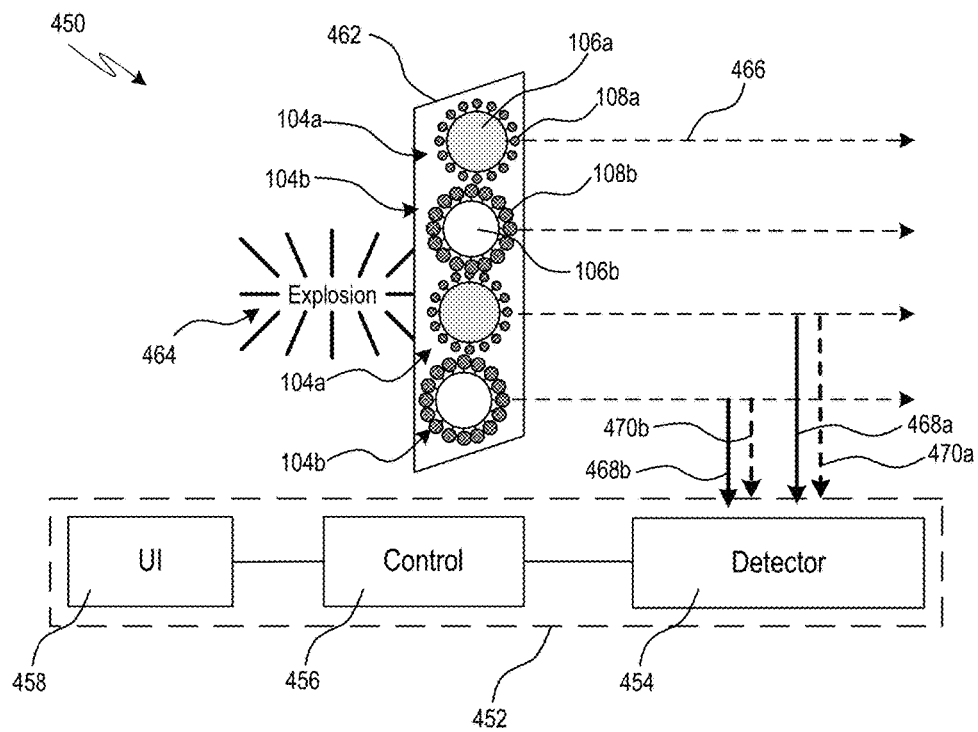
FIG. 4B is a simplified schematic diagram of another exemplary detection setup employing photoluminescent tracers, according to one or more embodiments of the disclosed subject matter.

For example, FIG. 4B illustrates an exemplary configuration 450 where a structure 462 has been provided with two different tracer particle complexes 104a, 104b. Tracer particle complexes 104a have a first substrate 106a and first cores 108a, and tracer particle complexes 104b have a second substrate 106b and second cores 108b. The second cores 108b can be larger than and have a different photoluminescent spectra from that of the first cores 108a. When the structure 462 is subjected to an explosion 464, the tracers particle complexes 104a, 104b are ejected along paths 466 with the distribution depending at least in part on the size of the constituent components of the tracers. Photoluminescent emission 470a, 470b from the cores 108a, 108b and the photoluminescent emission 468a, 468b from the substrates 106a, 106b can be detected by a detector 454 (e.g., spectrometer) of tracking system 452 as the tracers propagate along their respective flow paths 466 and/or once the tracers each their final disposition in a debris field. In some embodiments, detector 454 or a separate component of tracking system 452 (e.g., a separate light source, such as a light-emitting diode or laser diode) may generate radiation for exciting the tracers in the detection field. A controller 456 operatively coupled to the detector 454 processes signals therefrom indicative of the detected photoluminescence. For example, the controller 456 can correlate the detected photoluminescence spectra to particle size to track the movement of mass through time and space due to the explosion. Results of the processing by controller 456 can be visually displayed to a user via user interface 458 (e.g., display screen) or otherwise stored for subsequent use (e.g., in a model).

Alternatively or additionally, in some embodiments, the analysis of process block 310 can determine an identity of a structure or component thereof. For example, detection of a first emission spectra from a first tracer in a debris field can indicate that the debris originated from a first structure to which the first tracer was associated. The emission spectra of tracers can be tailored based on selection and fabrication of the substrate and QD cores, such that tracers applied to different structures have different emission spectra, thereby allowing discrimination between the tracers and associated origins within the same debris field.

For example, FIG. 4A illustrates an exemplary configuration 400 where a structure 410 has tracers 100 thereon that can be used to identify the structure 410 based on detected photoluminescent emission 412 from cores 108 and photoluminescent emission 414 from substrates 106. The photoluminescent emission 412, 414 can be detected by a detector 404 (e.g., spectrometer) of identification system 402. In some embodiments, detector 404 or a separate component of identification system 402 (e.g., a separate light source, such as a light-emitting diode or laser diode) may generate radiation for exciting the tracers in the detection field. A controller 406 operatively coupled to the detector 404 processes signals therefrom indicative of the detected photoluminescence. For example, the controller 406 can correlate measured peaks in the detected photoluminescence spectra 416 to a unique identifier 418 (e.g., based on a look-up table stored in memory). Results of the processing by controller 406 can be visually displayed to a user via user interface 408 (e.g., display screen) or otherwise stored for subsequent use (e.g., in a model).

Alternatively or additionally, in some embodiments, the analysis can map a flow path of fluid in which the tracers are disposed (e.g., using a setup similar to configuration 450 of FIG. 4B) and/or provide an indication of a fluid leak from a structure (e.g., using a setup similar to configuration 400 of FIG. 4A). Other detection systems and configurations are also possible according to one or more contemplated embodiments.

Although blocks 302-310 of method 300 have been described as being performed once, in some embodiments, multiple repetitions of a particular process block may be employed before proceeding to the next decision block or process block. Moreover, although FIG. 3 illustrate a particular order for blocks 302-310, respectively, embodiments of the disclosed subject matter are not limited thereto. Indeed, in certain embodiments, the blocks may occur in a different order than illustrated or simultaneously with other blocks. For example, the irradiation of process block 306 may occur simultaneously with the detection of process block 308. Alternatively, in some embodiments, the irradiation of process block 306 may be omitted, for example, where natural light or a pre-existing light source otherwise provides excitation of the photoluminescence of the tracer.

Figure 5:
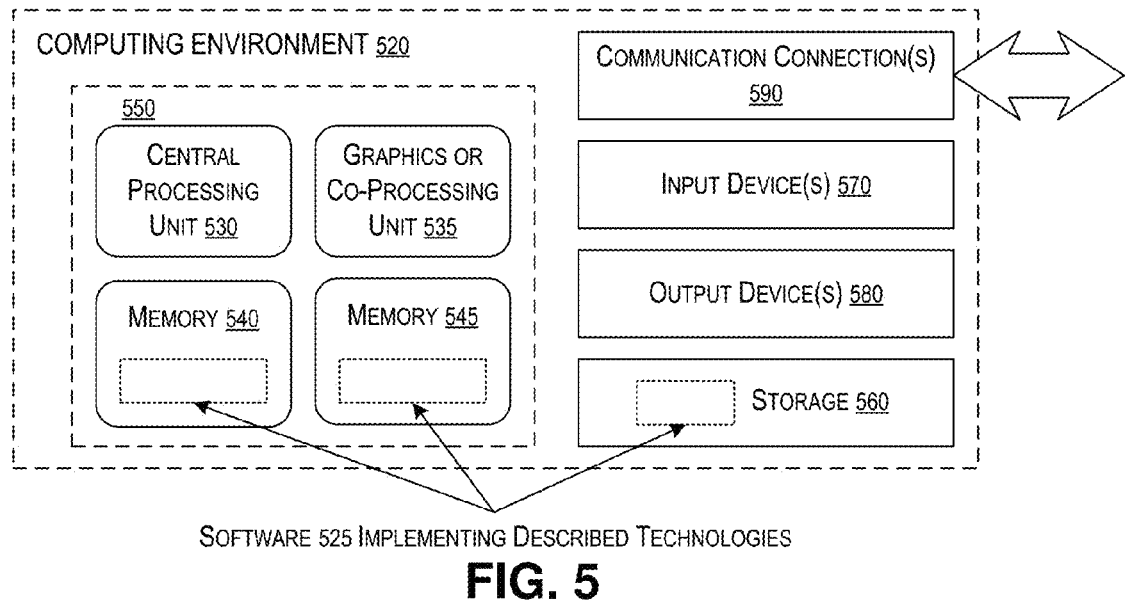
FIG. 5 a simplified schematic diagram depicting a generalized example of a computing environment in which the disclosed technologies may be implemented.

FIG. 5 depicts a generalized example of a suitable computing environment 520 in which the described innovations may be implemented, such as method 300, controller 406, and/or controller 456. The computing environment 520 is not intended to suggest any limitation as to scope of use or functionality, as the innovations may be implemented in diverse general-purpose or special-purpose computing systems. For example, the computing environment 520 can be any of a variety of computing devices (e.g., desktop computer, laptop computer, server computer, tablet computer, etc.). In some embodiments, the computing environment is part of an adaptive perfusion system. Alternatively, in some embodiments, the computing environment is a separate system connected to the adaptive perfusion system, for example, by making operative electrical connections (e.g., wired or wireless) to the adaptive perfusion system or components thereof.

With reference to FIG. 5, the computing environment 520 includes one or more processing units 530, 535 and memory 540, 545. In FIG. 5, this basic configuration 550 is included within a dashed line. The processing units 530, 535 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 530 as well as a graphics processing unit or co-processing unit 535. The tangible memory 540, 545 may be volatile memory (e.g., registers, cache, RAM), non-volatile memory (e.g., ROM, EEPROM, flash memory, etc.), or some combination of the two, accessible by the processing unit(s). The memory 540, 545 stores software 525 implementing one or more innovations described herein, in the form of computer-executable instructions suitable for execution by the processing unit(s).

A computing system may have additional features. For example, the computing environment 520 includes storage 560, one or more input devices 570, one or more output devices 580, and one or more communication connections 590. An interconnection mechanism (not shown) such as a bus, controller, or network interconnects the components of the computing environment 520. Typically, operating system software (not shown) provides an operating environment for other software executing in the computing environment 520, and coordinates activities of the components of the computing environment 520.

The tangible storage 560 may be removable or non-removable, and includes magnetic disks, magnetic tapes or cassettes, CD-ROMs, DVDs, or any other medium which can be used to store information in a non-transitory way, and which can be accessed within the computing environment 520. The storage 560 can store instructions for the software 525 implementing one or more innovations described herein.

The input device(s) 570 may be a touch input device such as a keyboard, mouse, pen, or trackball, a voice input device, a scanning device, or another device that provides input to the computing environment 520. The output device(s) 580 may be a display, printer, speaker, CD-writer, or another device that provides output from computing environment 520.

The communication connection(s) 590 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

EXAMPLES

Example 1

Zinc sulfide (ZnS) QDs were used as the phosphor material. ZnS QDs have high-temperature resistance, relatively stable crystalline lattice, photostability, and oxygen tolerance. The ZnS QDs were ruggedized using a modified Stöber method to encapsulate the QDs in a silica shell. The silica shells were functionalized a thiol-terminated ligand. A larger phosphor, europium-doped strontium aluminate (e.g., "glow-in-the-dark powder"), was encapsulated in a silica shell and functionalized with an amine-terminated ligand. The ZnS QDs and larger phosphor powder (also referred to herein as substrates) were covalently linked together by a molecule linker, sulfosuccinimidyl 4-[N-maleimidomethyl] cyclohexane-1-carboxylate (sulfo-SMCC), to form a tracer particle complex (e.g., a heterogeneous particle). The tracer particle complex was then disposed in a sodium silicate suspension (e.g., a sodium metasilicate gel, also known as waterglass). The covalent linkage (e.g., covalent bond) enabled unique photoluminescent peaks stemming from the europium and QDs.

To fabricate ZnS QDs, ethylene glycol (10 mL, 18.2 MΩ-cm) was added to an Erlenmeyer flask and gently heated (50° C.) and stirred (400 rpm). Zinc acetate (31.0 mg, 0.169 mmol) and cetyltrimethylammonium bromide (216 mg, 0.593 mmol) were added to the flask. Solid sodium sulfide (55.0 mg, 0.229 mmol) was dissolved in water (10 mL, 18.2 MΩ-cm) and slowly added to the flask. The flask was then capped with a rubber septum and heated to boiling (2 hours) with moderate stirring (400 rpm). Fabrication of doped ZnS QDs, a similar synthesis was followed, the details of which is reflected in Table 1 below.

TABLE 1

Dopant, ligand, solvent, and major emission information for fabrication of ZnS QDs.

| ZnS QD Dopant | Dopant Molar % | Ligand | Major luminescent color |
| --- | --- | --- | --- |
| None | N/A | Cetyltrimethylammonium bromide | Violet |
| Tb | 0.10 | Polyethylene Glycol (8K MW) Methacrylic Acid | Blue |
| O | Undetermined | Polyethylene Glycol (8K MW) | Green |
| Mn | 0.16 | Polyethylene Glycol (8K MW) Methacrylic Acid | Orange |
| Pb | 0.10 | Polyethylene Glycol (8K MW) Methacrylic Acid | Red/Broad Emission |

To form a protective shell around the QDs, a silication process was performed. Nano-pure water (6 mL, 18.2 MΩ-cm) was added to a centrifuge tube (15 mL). Collected QDs (16 mg by ZnS weight) were added to the centrifuge tube and vortex mixed (2 min, on high). Ethanol (4 mL, 65.7 mmol) and 3-mercaptopropyl trimethoxysilane (MPTMS) (5 μL, 0.027 mmol) were added in conjunction to the centrifuge tube. The centrifuge tube was vortex mixed (1 min, on high). Tetraethyl orthosilicate (TEOS) (214 μL. 0.96 mmol) and ammonium hydroxide (100 μL, 2.51 mmol) were added to the centrifuge tube sequentially. The centrifuge tube was sonicated in a bath sonicator with heat (60 min, 60° C.). Silication to form a protective shell around the substrates was carried out in a similar fashion.

The silica-encapsulated QDs (also referred to herein as silicated QDs) and the silica-encapsulated substrates (also referred to herein as silicated substrates) were then functionalized and coupled together using a molecular linker. The silicated QDs were resuspended in ethanol (10 mL, 0.164 M) in a centrifuge tube (15 mL). MPTMS (10 μL, 0.054 mmol) was added to the tube. The solution was vortex mixed (15 min, on high). The substrate (48 mg) was added to a separate centrifuge tube (15 mL). Ethanol (10 mL, 0.164 M) and 3-aminopropyl trimethoxysilane (APTMS) (10 μL, 0.056 mmol) was added to the tube. The solution was vortex mixed (15 min, on high). The QDs and the substrate were collected via centrifugation. The substrate was resuspended in a beaker (10 mL) with phosphate-buffered-saline (2 mL, pH 7.4). Sulfo-SMCC (50 μL, 4.5 mM) was then added to the buffer solution. The solution was reacted (30 min) while being stirred (1200 rpm). The substrate was collected and resuspended in fresh phosphate-buffered silane (2 mL, pH 7.4). The MPTMS-terminated QDs were added to the buffered solution and reacted (48 hours) with stirring (1200 rpm). The cross-linked QDs with substrate were collected via centrifugation and washed with water (10 mL, 18.2 MΩ-cm). This process was repeated three times to remove unbound QDs from the system.

The cross-linked QDs with substrate were then provided in suspension. The QDs bound to the substrate were added to a centrifuge tube (15 mL). Water (1 mL, 18.2 MΩ-cm) was added to the centrifuge tube and vortex mixed (2 min, on high) followed by sonication (5 min). Sodium silicate (218 mg. 1.18 mmol) was added to the centrifuge tube and vortexed (1 min, on high) followed by sonication with heat (30 min, 20° C.). The luminescent suspension was then used in paints or as a tags for various testing platforms.

Example 2

Figure 6A:
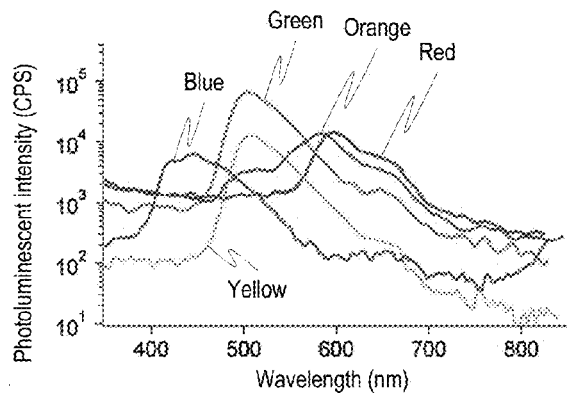
FIGS. 6A-6B are graphs of photoluminescent spectra emitted by various strontium-aluminate substrates in response to irradiation with excitation light having a wavelength of 325 nm and 405 nm, respectively.
Figure 6B:
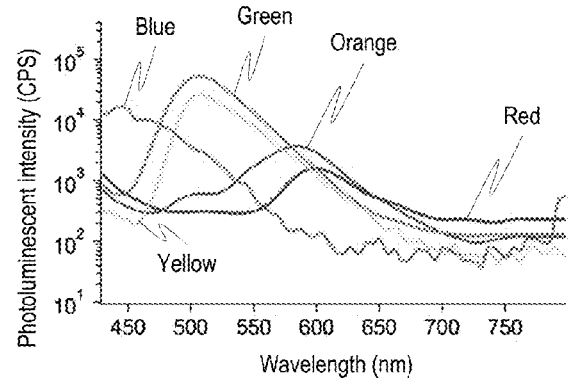
Figure 6C:
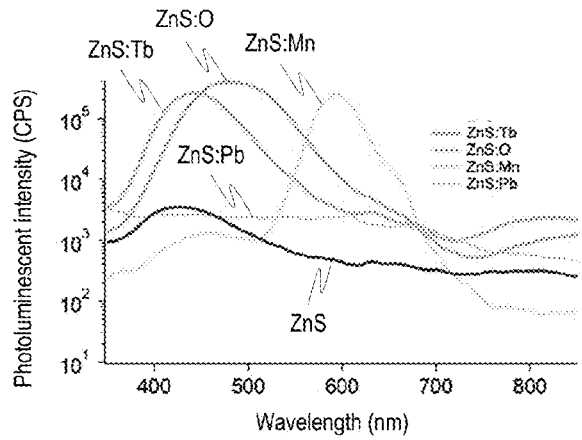
FIGS. 6C-6D are graphs of photoluminescent spectra emitted by various zinc sulfide (ZnS) quantum dots (QDs) in response to irradiation with excitation light having a wavelength of 325 nm and 405 nm, respectively.
Figure 6D:
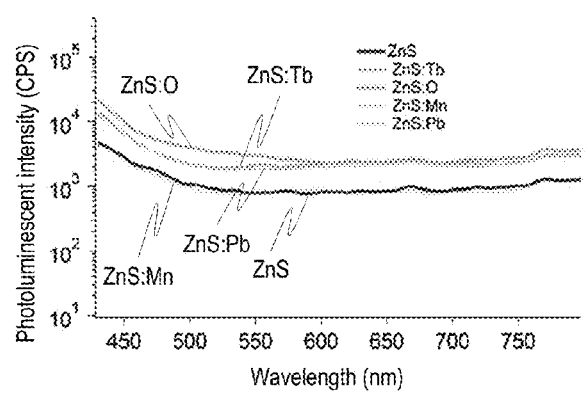
Figure 7A:
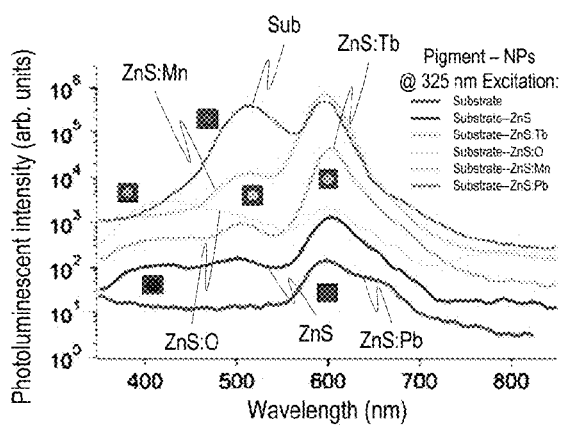
FIG. 7A is a graph of photoluminescent spectra emitted by tracer particle complexes, formed by various combinations of red strontium-aluminate substrates and ZnS QDs, in response to irradiation with excitation light having a wavelength of 325 nm.
Figure 7B:
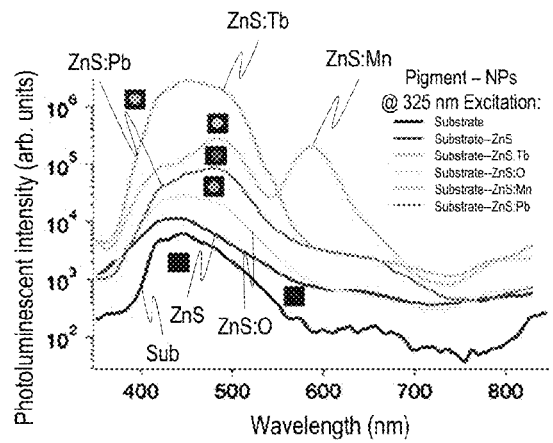
FIG. 7B is a graph of photoluminescent spectra emitted by tracer particle complexes, formed by various combinations of blue strontium-aluminate substrates and ZnS QDs, in response to irradiation with excitation light having a wavelength of 325 nm.
Figure 7C:
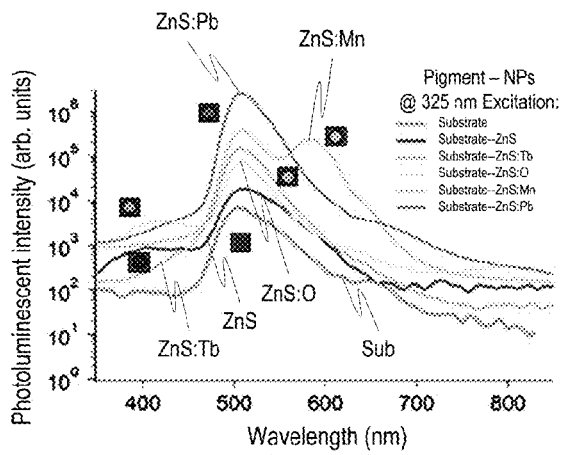
FIG. 7C is a graph of photoluminescent spectra emitted by tracer particle complexes, formed by various combinations of green strontium-aluminate substrates and ZnS QDs, in response to irradiation with excitation light having a wavelength of 325 nm.
Figure 7D:
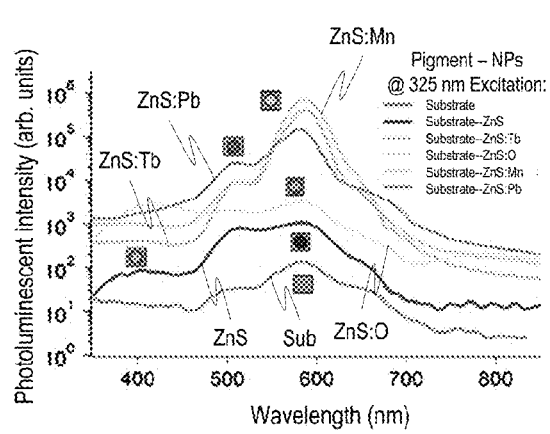
FIG. 7D is a graph of photoluminescent spectra emitted by tracer particle complexes, formed by various combinations of orange strontium-aluminate substrates and ZnS QDs, in response to irradiation with excitation light having a wavelength of 325 nm.
Figure 7E:
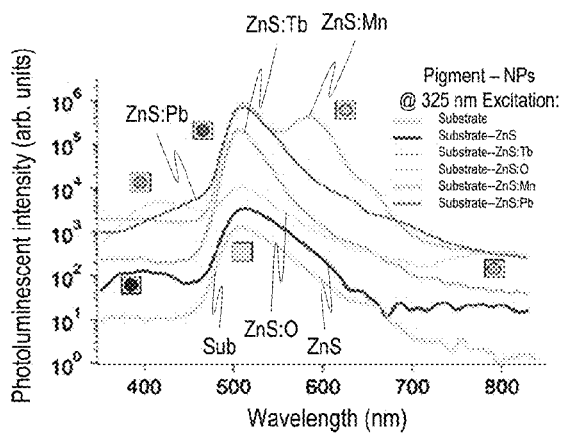
FIG. 7E is a graph of photoluminescent spectra emitted by tracer particle complexes, formed by various combinations of yellow strontium-aluminate substrates and ZnS QDs, in response to irradiation with excitation light having a wavelength of 325 nm.

Photoluminescent spectra for various ZnS QDs and phosphor substrates were separately obtained using a spectrofluorometer and are presented in FIGS. 6A-6D. These photoluminescent spectra were excited with 325 nm light (FIGS. 6A, 6C) to excite the substrates and the QDs, and then with 405 nm light (FIGS. 6B, 6D) to excite the substrates alone. As shown in FIG. 6C, photoluminescent spectra of ZnS QDs have a peak centered on $\lambda=431$ nm. Upon the incorporation of mid-gap states by the dopants of the ZnS QDs, a red-shift in the spectrum can be observed, for example, $\lambda=449$ nm for Tb as the dopant, $\lambda=496$ nm for O as the dopant, $\lambda=599$ nm for Mn as the dopant. For ZnS QDs with Pb as the dopant, the QD acts as a red phosphor emitter with a very broad emission.

As shown in FIGS. 6A-6B, the substrate exhibits photoluminescence around $\lambda=500$ nm, which can be red-shifted or blue-shifted depending on alterations to the internal crystal structure of the material during the manufacturing process. The lower energy band gap of the phosphor substrate can allow easy sample debris verification with a standard UVA-I/violet light source (e.g., $\lambda_{ex}=405$ nm, as in FIG. 6B) without otherwise exciting the ZnS QDs (as in FIG. 6D). The dual emission nature of the tracer particle complex can allow both field and laboratory identification. For example, FIGS. 7A-7E show the photoluminescence spectra of various ZnS QDs bound to various substrates. The tracer particle complex were excited at $\lambda_{ex}=325$ nm light and can be seen to have characteristic peaks in their spectrum depending on the choice of QDs bound to substrate. The appearance of shoulder peaks is indicative of the QDs photoluminescence, which can be seen in FIGS. 7A-7E. The variety of combinations of QDs and phosphor substrates available for the tracer particle complexes allows for easy laboratory identification of debris from tagged field experiments.

Example 3

Figure 8A:
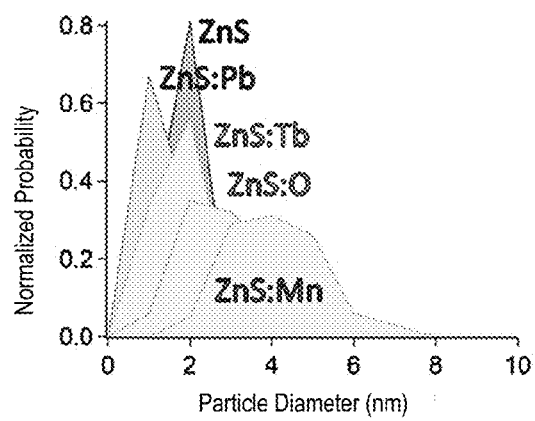
FIGS. 8A-8B are graphs of normalized size distributions of various fabricated ZnS QDs and fabricated silica protective shells, respectively.
Figure 8B:
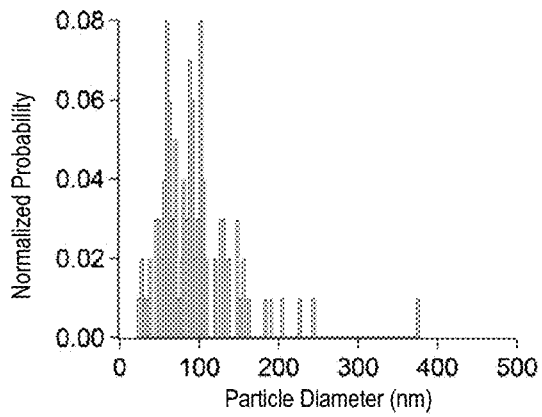

Microscopic analysis of the fabricated ZnS QDs found lattice fringes that are consistent with wurtzite crystalline morphology intrinsic to this type of ZnS QD synthesis. Each type of the ZnS QDs varies in size between 1 nm and 8 nm, with a majority of nanoparticles having a diameter between 1 nm and 3 nm, as shown in FIG. 8A. This variation in particle size may be attributed to the different reducing environments. Microscopic analysis of the silicated QDs shows the ZnS QD nanoparticles suspended within a silica shell. The shelling of the QDs adds to the robustness of the particles by acting as a sacrificial layer at elevated temperatures and pressures. However, since the silica shell is an optically translucent layer, photons can be transmitted between the QDs contained therein and the external environment. The QDs were encased in the silica shells with an average number of 103±15 QDs per shell and an average spacing between neighboring QDs of 2.4±1 nm. FIG. 8B shows the normalized size distribution of the silica shells with QDs contained therein.

Figure 8C:
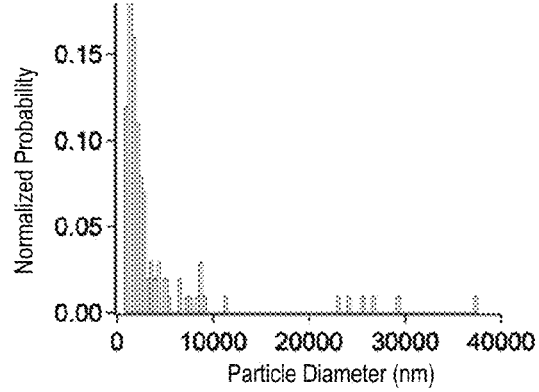
FIG. 8C is a graph of normalized size distribution of bound nanoparticles (e.g., silica-encapsulated ZnS QDs) to a strontium-aluminate substrate.
Figure 8D:
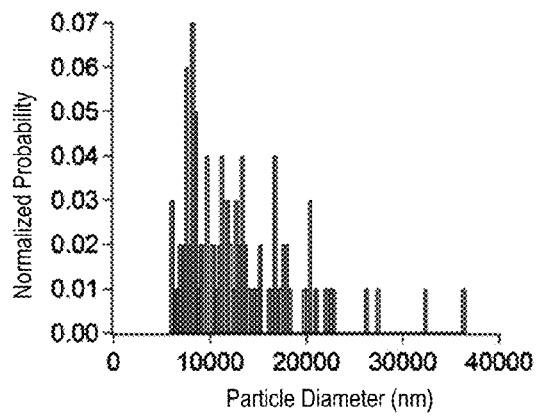
FIG. 8D is a graph of normalized size distribution of the nanoparticle-substrate complex disposed in a silicate gel.

The silica shells were molecularly linked to the shells of the substrates, which resulted in a tracer particle complexes that were nominally 1 µm in diameter, as shown in FIG. 8C. The tracer particle complexes (QD-covered substrate powders) were then suspended in silica gel (e.g., waterglass) to further protect the tracer particle complex from harsh environments (e.g., explosive or caustic environments) and thereby increase the yield of optically-active luminescent tracers after exposure (e.g., in a debris field). FIG. 8D shows the normalized size distribution of the tracer particle complexes within the silica gel.

Example 4

A series of tracers (e.g., size-selected ZnS and CdSe QDs coupled to phosphor substrates in a sodium metasilicate gel) were synthesized and explosively distributed by an exploding bridge wire. The distribution of the tracer particle complexes was analyzed using their unique luminescence signatures. A bench-scale approach was employed to test the ruggedness of the dual emission tracers. The tracers were mixed in a 20:1 ratio (tracer particle complexes to high-temperature paint, by weight). The paint, with two unique tracers, was coated onto 0.002-in. diameter wires by dripping the suspension over differing elemental metal wires in a three-part series. The tracers were placed in such a way such that the position of each tracer in the debris field was relative to its starting position on the wire.

The wires were then placed in an exploding-bridgewire (EBW) generator and then energized to cause an explosion. The EBW generator had four main components: a high-voltage charging unit, energy storage capacitors, a triggered spark gap, and an assembly that holds the exploding wire. One end of the wire is connected to ground and the other to one side of the spark gap electrodes. In operation, the target wire is fitted into the sample holder and the capacitors are charged to the required voltage, which typically takes 30-60 s. To prevent premature firing, the spark gap acts as an open switch, isolating the target wire from the charged capacitors. To discharge the stored energy rapidly through the wire on a microsecond timescale, a low-current high-voltage spark is used to breakdown the air in the spark gap. This effectively connects the charged capacitors to the target wire, which is then very rapidly heated and explosively vaporizes by the stored energy. The energy storage capacitors included four 30 µF capacitors with a voltage rating of 4500 V mounted in parallel. When charged to 4000 V, this would provide up to 960 joules of stored energy, which is small compared to some systems that have been built with mega joule energy capacities. However, the system is still more than adequate to vaporize a 0.1 mm diameter tungsten wire, even at reduced charging voltages.

Figure 9:
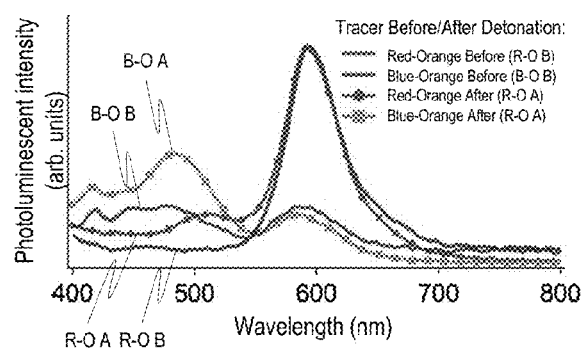
FIG. 9 is a graph of photoluminescent spectra for different tracer particle complexes prior to and after being subjected to a harsh environment (e.g., explosive detonation), in response to irradiation with excitation light having a wavelength of 325 nm.

The tracers were exposed to relevant specific energies that could be expected in an explosive environment. The wires were detonated at different specific energies. Yet, the tracers exhibited uniform performance with minimal degradation at specific energies that, in some cases, almost doubled what would be expected from conventional chemical explosives. Fluorescent spectra from the pre and post detonated tracers show good agreement of the peak emissions. As shown in FIG. 9, there are slight shifts of the peaks upon detonation, which may have been caused by changes to the crystalline structure due to the high temperatures of the explosions. However, there was still good agreement in the overlapping pre- and post-spectra indicating that the dual emission systems retained their luminescent signature post-explosion. In FIG. 9, an appearance of a new peak, which formed from $\lambda$=485-508 nm in both the post red and blue tracers, may be indicative of partial oxidation of the tracer. This peak was likely due to oxidation, as both substrate and QDs evolved a green luminescence during static temperature testing.

Example 5

Environmentally-inert and size-selected particles with unique identifiers can enable measurements of particulate transport, for example, in especially harsh environments. By using timed extraction of particles for the silication process and/or reagent concentration control, silicated QD cores can be fabricated with controlled diameters on the micron scale. The ability to create uniformly sized particles linked to easily identifiable characteristics, such as luminescence, can allow for creation of flow-based particle distribution models.

Size-selected bands of microscale silicated ZnS QDs were synthesized, in particular, silicated QD cores having diameters of 1, 2, 3, and 4 µm. ZnS QDs (16 mg) were added to a centrifuge tube with 4 mL of ethanol and 6 mL of deionized (DI) water. Then 5 µL (3-mercaptopropyl) trimethoxysilane (MPTMS) were added to the tube. The tube was then vortexed and 100 µL TEOS was added. A stir rod was provided in the tube, and the tube was placed on a stir plate with no heat. The time of the silication process initiated with addition of 100 µL of ammonium hydroxide to the tube. At 4 minutes and 45 seconds after the start of the silication process, a first batch of silicated QDs were removed from the centrifuge tube and washed with DI water three times. For larger sizes, the silication process was allowed to continue. At 22 minutes after the start of the silication process, a second batch of silicated QDs were removed from the centrifuge tube and washed with DI water three times. For larger sizes, the silication process was allowed to continue. At 35 minutes after the start of the silication process, 100 µL of TEOS was added to the centrifuge tube, and the silication process was allowed to continue. At 45 minutes after the start of the silication process, a third batch of silicated QDs were removed from the centrifuge tube and washed with DI water three times. For larger sizes, the silication process was allowed to continue. At 65 minutes after the start of the silication process, a fourth batch of silicated QDs were removed from the centrifuge tube and washed with DI water three times.

Figure 10A:
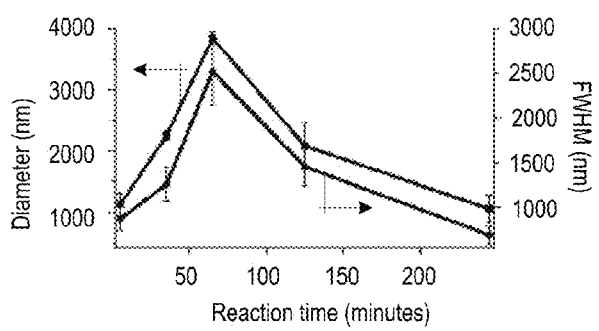
FIG. 10A is a graph of resulting silica-encapsulated nanoparticle diameter as a function of silication reaction time (e.g., with respect to addition of a catalyst, ammonium hydroxide).
Figure 10B:
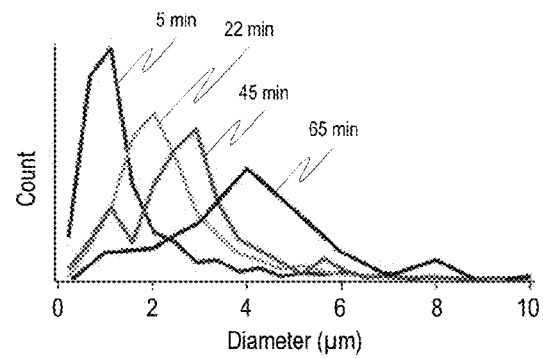
FIG. 10B is a graph of size distributions of fabricated silica-encapsulated nanoparticles for different silication reaction times.

As shown by the fluoroscope particle sizing of FIG. 10A, the reaction time (as a function of removal from the silication process) dictated the primary particle size for the silicated QDs. In particular, the first batch of silicated QDs (~5 minutes) had a diameter of 1 µm, the second batch of silicated QDs (22 minutes) had a diameter of 2 µm, the third batch of silicated QDs (45 minutes) had a diameter of 3 µm, and the fourth batch of silicated QDs (65 minutes) had a diameter of 4 µm. FIG. 10B further shows the relative particle count versus diameter from optical fluorescence imaging of the particle from the four batches. As evidenced by the figures, the control of reaction time for the silication process enables control over silicated QD particle size on the micron scale, with relatively stable luminescent intensity with increasing particle size.

Example 6

Experimental determination of luminous intensity, as well as chemical environmental tolerance tests, were conducted to ensure an inert nature and ability to make unique identifiers. The chemical environmental tolerance test was conducted by submerging silicated QDs in acidic and basic solutions, and their luminescence was recorded via spectrophotometer over two months to observe changes. In particular, 10 samples of silicated QDs and 1 control sample were tested in various pHs in a range of 3 to 13. Samples were prepared by diluting sized, silicated luminescent particles in varying concentrations of ammonia hydroxide for basic solutions or acetic acid for acidic solutions. Luminescence was collected several times a week over two months. All QDs in the chemical environmental tolerance test were derived from the same batch of initial fabrication of ZnS:Mn QDs and the same silication batch, with a silica shells having a diameter of 103±16 nm. The QDs were distributed evenly across all samples.

To prepare the samples for data collection, solutions in a scintillation vial that were kept in a desiccator were parafilmed and vortexed. All samples were sonicated for approximately 5 minutes. A polymethyl methacrylate (PMMA) cuvette with DI water was tested in the spectrophotometer to get a background reading. Then the control spectrum was measured, followed by measurement of samples for basic pH and then the measurement of samples for acidic pH. Sixteen data points were collected over a two month time span, and the raw data was analyzed by integrating the intensity from the luminescence.

Figure 11:
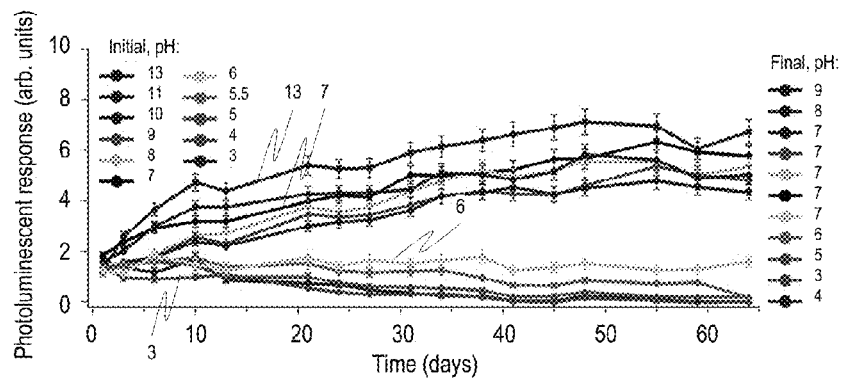
FIG. 11 is a graph of integrated photoluminescence intensities over time when subjected to different pH environments (initial and final pH values listed), in response to irradiation with excitation light having a wavelength of 325 nm.

FIG. 11 shows the results of the environmental durability photoluminescent intensity versus time in the reactive environment. Particles in the basic environments had a steady increase in photoluminescence intensity for 60 days, with strong bases (e.g., greater than pH 9) exhibiting enhanced fluorescence. In contrast, strong acids (e.g., less than pH 5) degrade photoluminescent intensity over time. Nevertheless, the silicated QDs remain durable for up to 40 days in strong acids and indefinitely in basic environments. Storing silicated QDs in a weakly basic solution may help mitigate photoluminescent intensity degradation when the silicated QDs are later exposed to acidic environments.

Example 7

Figure 12:
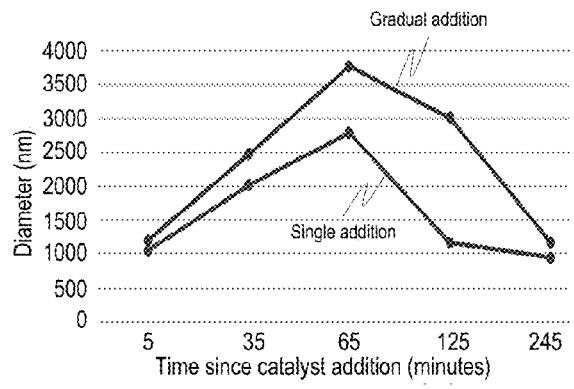
FIG. 12 is another graph of resulting silica-encapsulated nanoparticle diameter as a function of silication reaction time (e.g., with respect to addition of a catalyst, ammonium hydroxide).

Particle size of the silicated QDs was controlled by gradual addition of TEOS during the silication process. First and second centrifuge tubes were provided, and 16 mg of ZnS QDs were added to each. To each tube 4 mL of ethanol, 6 mL of DI water, and 5 µL MPTMS was then added. In the first centrifuge tube, 300 µL of TEOS was added. In the second centrifuge tube, 100 µL of TEOS was added. Stir rods were added to each tube and used to mix the contents in the tubes while 100 µL of ammonium hydroxide was added to each. The addition of the ammonium hydroxide initiated the start of the silication process. At 5 minutes after initiation of the silication process, a sample from each tube was removed for testing. Into the second centrifuge tube, 100 µL of TEOS was also added. At 35 minutes after initiation of the silication process, another sample from each tube was removed for testing, and another 100 µL of TEOS was added to the second centrifuge tube. At 65 minutes after initiation of the silication process, another sample from each tube was removed for testing, and another 50 µL of TEOS was added to the second centrifuge tube. At 125 minutes after initiation of the silication process, another sample from each tube was removed for testing, and another 50 µL of TEOS was added to the second centrifuge tube. As shown in FIG. 12, the gradual addition of TEOS during the silication process in the second centrifuge tube resulted in control of resulting diameters based on reaction timing, similar to the single addition of TEOS during the silication process in the first centrifuge tube. However, the gradual addition of TEOS resulted in larger particle diameters for the resulting silicated QDs.

Example 8

Particle size can also be controlled by repeating the silication process to form aggregates of cores. By changing dopants for the fabricated QDs, the photoluminescent spectra can be tailored to match the controlled particle, thereby allowing the measured photoluminescent spectra to provide an indication of the underlying particle size.

ZnS:Mn QDs were synthesized by adding 104 mL of ethylene glycol into a 500 mL Erlenmeyer flask, followed by 0.967 g of $Zn(Ac)_2$. The mixture was stirred while 0.781 mL of methacrylic acid was added. This was followed by an addition of 0.594 mL of a 1.8 mg/ml $Mn(Ac)_2$ solution, a 0.1% mol ratio with the $Zn(Ac)_2$. Next, 3.124 g of polyethylene glycol (PEG) was added to the mixture. The solution was then heated to near boiling temperature, and 1.771 g of NaS was added over the course of ten minutes. Once the addition of NaS was complete, the solution was boiled for two hours, with adjustments to solution volume. The slurry was transferred and split between three centrifuge tubes, centrifuged for five minutes, and the supernatant was removed. The resulting solid was rinsed three times by adding 25 mL of water (18 MΩ·cm), vortex mixing for two minutes, centrifuging for five minutes, and removing the supernatant. The final ZnS:Mn QDs were then stored in 10 mL of water (18 MΩ·cm).

ZnS:Tb QDs were synthesized by adding 105 mL of ethylene glycol into a 500 mL three-neck round-bottom flasks, followed by 1.08 g $Zn(Ac)_2$. The mixture was heated to near boiling temperature. 0.781 mL of methacrylic acid, 3.183 g of PEG, and 0.75 mL of 2.4 mg/mL $Tb(Ac)_3$ in water (0.01% mol eq) were then added. The flask was fitted with a rubber septa on one neck. A gas adapter was attached to a flowing stream of Ar, while the final neck was left open to allow for gas to escape. Over the course of 10 minutes, 1.918 g of solid NaS was added to the stirring boiling mixture. The mixture was allowed to boil for four hours, after which a rinsing centrifuging procedure similar to that described above for the ZnS:Mn QDs was performed.

ZnS:O QDs were synthesized by adding 315 mL of ethylene glycol and 0.963 g of $Zn(Ac)_2$ to a 500 ml beaker. While stirring 6.548 g of PEG was added, followed by the slow addition of 1.985 g of NaOH. The reaction was brought to a boil under a steady stream of air, and 1.705 g of NaS was added slowly. The mixture was held at a rolling boil for four hours, replenishing the ethylene glycol as needed. A rinsing centrifuging procedure similar to that described above for the ZnS:Mn QDs was performed.

After the synthesis of QDs was complete, the QDs were centrifuged and the supernatant was removed in preparation for the silication process. A small portion of the QDs (e.g., ~0.1 g) was transferred into four individual 50 mL centrifuge tubes. Into each vial, 10 mL of water was added and vortexed on high for 2 minutes. Ethanol (6 mL) was added, followed by 0.030 mL of (3-mercaptopropyl)trimethoxysilane. This mixture was vortex for one minute on high. To this mixture 1.2 mL of TEOS and 0.6 mL of 50% ammonium hydroxide were added. The mixture was then sonicated for one hour at 60° C., after which each flask was centrifuged for ten minutes. The supernatant was disposed of, and the process was repeated three times, rinsing with 20 mL of water in each rinse.

Figure 13:
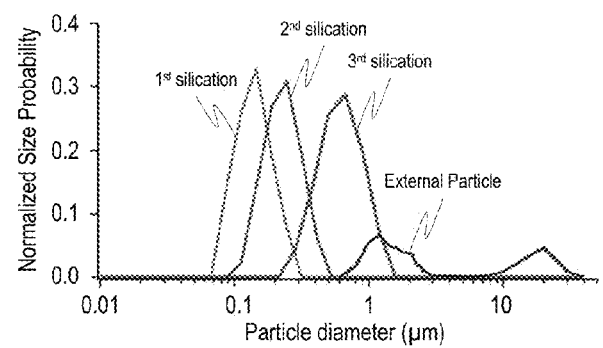
FIG. 13 is a graph of normalized size distributions of fabricated silica-encapsulated nanoparticles after one, two, and three silication processes, and of a silica-encapsulated substrate (e.g., external particle).

The ZnS:O QDs were isolated, as they were not to be further silicated. The silication process was repeated one more time for the ZnS:Tb QDs and two more times for the ZnS:Mn QDs, using similar quantities of each reagent and vortex mixing to re-suspend the QDs. Layering the silications was found to increase the size of the resulting cores (encapsulated QDs). As shown in FIG. 13, the single silication process for the ZnS:O QDs yielded particle diameter for the resulting encapsulated QDs of 125±53 nm. The double silication process for the ZnS:Tb QDs yielded particle diameter for the resulting encapsulated QDs of 265±97 nm. The triple silication process for the ZnS:Mn QDs yielded particle diameter for the resulting encapsulated QDs of 735+225 nm. Meanwhile, the silication of the substrate (e.g., external particles of strontium aluminate) yielded a bimodal distribution of particle diameters, with the particles being distributed between a cluster at 1.2 mm and another cluster at 19 mm.

Example 9

The active mass of QDs was quantitatively measured by photoluminescence before and after explosive dispersal in a 6.5 cm diameter integrating spheres. Each layer of the tracer was then added in sequence, and the active mass was quantified post detonation. In this fashion, the relative increase in "ruggedness" (e.g., that the mass of the tracer remains optically active after detonation) can be quantified for each tracer layer. The inner surface of each sphere was coated with barium sulfate to provide a white standard background, the spheres themselves were printed from black acrylonitrile butadiene styrene (ABS) plastic at a high density. 5 mg of ZnS:Mn QDs were loaded into each 10 cm long, 800 µm diameter thin-walled steel tube, and the ends were crushed shut. Four types of tracer were evaluated: (1) a control containing only DI water (the liquid) for the suspension; (2) 5 mg of orange-emitting QDs in DI water; (3) 5 mg of orange-emitting QDs encapsulated by 100 nm thick silica shells; and (4) 5 mg of orange-emitting QDs encapsulated by 100 nm thick silica shells and suspended in saturated sodium metasilicate ($SiO_2$ gel). Two small holes were drilled in each sphere, and the steel tubes were fed through so as to pass through the center of the sphere. The devices were loaded into an exploding bridge wire (EBW) generator and detonated with 750 J of energy.

Figure 14:
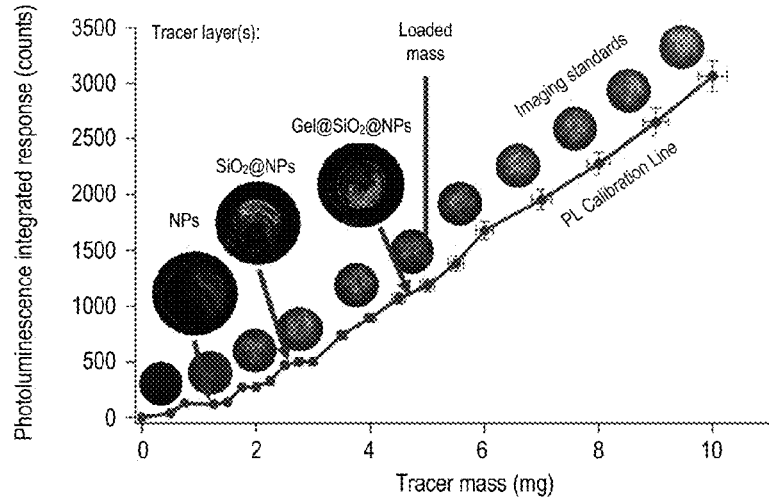
FIG. 14 shows photoluminescence spectroscopy and imaging of integrating spheres, with the large callouts mapping orange tracer distribution inside the sphere, a detonated sphere for each layer of the tracing being shown, and the corresponding photoluminescent spectroscopic response being shown on the calibration line.

The spheres were collected, and the mass of tracer optically active was determined. In particular, the mass was quantified by photoluminescent spectroscopy and photoluminescent imaging of the spheres split open. The photoluminescent spectroscopic intensity was found to increase at a slope of about 310 counts/mg based off of a calibration line. FIG. 14 shows the results of the mass quantification. As can be seen in FIG. 14, the addition of each subsequent layer increases the optically active mass on the sphere wall, and the fraction of QDs remaining optically active after the explosion increases with the addition of each subsequent layer. The final fraction of surviving particles was 92.5±6.9%.

Example 10

Composite core was fabricated using ZnS QDs to protect CdSe QDs (ZnS@CdSe). To fabricate the CdSe QDs, first $Cd(NO_3)_2$ was converted into an organic form, such as $Cd(Myr)_2$. 30 mL of methanol ($CH_3OH$) was added to a first flask, followed by additions of 0.12 g of sodium hydroxide (NaOH) and 0.6 g of Myristic acid ($CH_3(CH_2)_{12}COOH$). The first flask was then sonicated and heated to form a solution. In a second flask, 0.308 g of cadmium nitrate tetrahydrate ($Cd(NO_3)_2 \cdot 4H_2O$) was dissolved in 5 mL of methanol. The contents of the second flask were then added to the first flask in a dropwise fashion with periodic mixing. Using a Büchner funnel, the precipitant from the first flask was isolated and subsequently dried in an oven at 100° C. for 1.5 hours. The resulting dried power was transferred to a vial and crushed to form $Cd(Myr)_2$ particles.

To fabricate the CdSe QDs, 300 mg of $Cd(Myr)_2$ and 48 mg of selenium (Se) powder were added to a flask. 30 mL of octadecene ($C_{18}H_{36}$) was then added to the flask and the contents of the flask were mixed. The contents were then heated at 100° C. for 20 minutes under vacuum, after which the temperature was increased to 190° C. for 10-20 minutes to allow the Se powder to fully dissolve. The temperature was then gradually increased to 240° C. under vacuum, until the color of the solution changed from yellow to deep orange. After the color change, the vacuum was turned off and 160 mg of cadmium acetate ($Cd(CH_3CO_2)_2$) was added. After the cadmium acetate addition, the vacuum was reinstated and heating maintained at a temperature to 240° C. for approximately 8 minutes. The solution was then removed from heating and allowed to cool under vacuum, with 2 mL of oleic acid ($C_{18}H_{34}O_2$) added to the solution when the temperature reached 160° C.

Once the solution cooled to room temperature, the solution was placed in a centrifugation tube and combined with a mixture of ethanol ($C_2H_6O$) and toluene ($C_7H_8$) in a 2:1 ratio. The contents of the tube were thoroughly mixed and then centrifuged for 10-20 minutes. Phosphorescence of the tube contents was excited using blue light, and the process was repeated if phosphorescence was observed in the supernatant. Otherwise, the supernatant was discarded, and a small volume of toluene was added to the aggregated CdSe particles. 200 μL of oleic acid was then added to the tube and sonicated to resuspend the particles, forming CdSe nanorods.

To grow a ZnS shell around the CdSe QDs to improve the air-stability of the CdSe QDs, first 681.43 mg of zinc chloride ($ZnCl_2$) and 5 mL of oleyamine ($C_{18}H_{35}NH_2$) were mixed together to form a stock solution. To form phosphorescent QD cores that emitted green-yellow wavelengths, toluene was used as the solvent. In particular, 200 μL of 0.125 μM CdSe nanorods solution was added to 5 mL of toluene in flask and mixed. 17.34 mg of trioctylphosphine oxide (TOPO) ($OP(C_8H_{17})_3$) was then added to the solution and dissolved, followed by the addition and dissolving of 2 μL of carbon disulfide ($CS_2$). 3.5 mg of zinc diethylcarbamodithioate (DDTC) ($Zn[(C_2H_5)_2NCS_2]_2$) was then added and dissolved. 20 μL of 0.5M zinc chloride stock solution was then added and dissolved. The resulting solution was heated at 110° C. for 1 hour, and then allowed to cool to room temperature. 12 mL of ethanol was then added to the particles resulting from the heating, and the particles were subsequently isolated using centrifugation. A small volume of toluene was added to the aggregated particles. 20 μL of oleic acid and 3 crystals of TOPO were then added to the particles in the tube, followed by sonication for resuspension of the ZnS@CdSe particles.

To form phosphorescent QD cores that emitted orange wavelengths, dichlorobenzene (DCB) was used as the solvent. In particular, 200 μL of 0.125 μM CdSe nanorods solution was added to 5 mL of DCB in a first flask and mixed. In a second flask, 86.7 mg of TOPO was added to 1 mL of DCB and dissolved, followed by the addition and dissolving of 10 μL of carbon disulfide. 16 mg of zinc DDTC was then added to the second flask and dissolved. 100 μL of 0.5M zinc chloride stock solution was then added to the second flask and dissolved. The first flask was then heated to and held at 150° C. With the temperature at 150° C., the contents of the second flask were added to the first flask at a rate of 1 mL per hour, and the combined solutions were subsequently allowed to react at 150® C. for 1 hour. The solution was then allowed to cool to room temperature. 12 mL of ethanol was then added to the particles resulting from the heating, and the particles were subsequently isolated using centrifugation. A small volume of toluene was added to the aggregated particles. 20 μL of oleic acid and 3 crystals of TOPO were then added to the particles in the tube, followed by sonication for resuspension of the ZnS@CdSe particles.

Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A tracer, comprising:
 a silicate suspension having therein a plurality of tracer particle complexes, each tracer particle complex comprising:
  a photoluminescent substrate encapsulated by a first protective layer; and
  a core coupled to the photoluminescent substrate and comprising one or more photoluminescent quantum dots encapsulated by a second protective layer.

Clause 2. The tracer of clause 1, wherein each of the first and second protective layers comprises a porous silica shell.

Clause 3. The tracer of clause 2, wherein the porous silica shell is loaded with water.

Clause 4. The tracer of any one of clauses 1-3, wherein the silicate suspension comprises sodium metasilicate ($Na_2SiO_3$), for example, a gel of sodium metasilicate.

Clause 5. The tracer of any one of clause 1-4, wherein, for each tracer particle complex:
 one of the first and second protective layers is functionalized with an amine-terminated ligand,
 the other of the first and second protective layers is functionalized with a thiol-terminated ligand, and
 the core is coupled to the photoluminescent substrate via one or more bonds (e.g., chemical bond) between a molecular linker and the amine-terminated and thiol-terminated ligands.

Clause 6. The tracer of clause 5, wherein the molecular linker comprises an amine-to-sulfhydryl crosslinker (e.g., sulfosuccinimidyl 4-[N-maleimidomethyl] cyclohexane-1-carboxylate (sulfo-SMCC)).

Clause 7. The tracer of any one of clauses 1-6, wherein each tracer particle complex comprises an agglomeration of multiple cores directly or indirectly coupled to the corresponding photoluminescent substrate.

Clause 8. The tracer of any one of clauses 1-7, wherein a diameter of each core is about 1 μm or less, a diameter of the agglomeration of multiple cores is greater than 1 μm (e.g., within a range of 1-5 μm), or both.

Clause 9. The tracer of any one of clauses 1-8, wherein a diameter of each quantum dot is less than or equal to 8 nm (e.g., in a range 1-8 nm, or 1-3 nm), multiple quantum dots are encapsulated by the same second protective layer, or both.

Clause 10. The tracer of any one of clauses 1-9, wherein the one or more photoluminescent quantum dots comprises a semiconductor material (e.g., one of the Group II-VI semiconductors), the substrate comprises a phosphorescent material, or both.

Clause 11. The tracer of any one of clauses 1-10, wherein the one or more photoluminescent quantum dots comprises zinc sulfide or cadmium selenide, the substrate comprises doped strontium aluminate, or both.

Clause 12. The tracer of any one of clauses 1-11, wherein at least some of the cores in the silicate suspension have a diameter different from that of others of the cores in the silicate suspension.

Clause 13. The tracer of any one of clauses 1-12, wherein at least some of the cores in the silicate suspension have a peak wavelength for photoluminescent emission that is different from that of others of the cores in the silicate suspension.

Clause 14. The tracer of any one of clauses 1-13, wherein at least some of the substrates in the silicate suspension have a peak wavelength for photoluminescent emission that is different from that of others of the substrates in the silicate suspension.

Clause 15. The tracer of any one of clauses 1-14, wherein, for each tracer particle complex, the core comprises a first quantum dot covered by a plurality of second quantum dots.

Clause 16. The tracer of claim 15, wherein each second quantum dot is more stable in air than the first quantum dot, the first quantum dot has a photoluminescent emission intensity greater than that of each second quantum dot, or both.

Clause 17. The tracer of any one of clauses 15-16, wherein the first quantum dot comprises cadmium selenide, each second quantum dot comprises zinc sulfide, or both.

Clause 18. The tracer of any one of clauses 15-16, wherein the first quantum dot comprises a metal or semiconductor, each second quantum dot comprises zinc sulfide, or both.

Clause 19. The tracer of clause 18, wherein the first quantum dot is a gold (Au) quantum dot or a copper (Cu) quantum dot.

Clause 20. The tracer of any one of clauses 1-19, wherein one, some, or all of the photoluminescent quantum dots are doped.

Clause 21. The tracer of any one of clauses 1-20, wherein one, some, or all of the photoluminescent substrates are doped.

Clause 22. The tracer of any one of clauses 20-21, wherein a dopant for the quantum dots and/or substrates comprises terbium (Tb), oxygen (O), manganese (Mn), lead (Pb), samarium (Sm), europium (Eu), copper (Cu), or any combination thereof.

Clause 23. A method, comprising:
providing a tracer on or in a structure, the tracer comprising a silicate suspension having therein a plurality of tracer particle complexes, each tracer particle complex comprising:
a photoluminescent substrate encapsulated by a first protective layer; and
a core coupled to the photoluminescent substrate and comprising one or more photoluminescent quantum dots encapsulated by a second protective layer;
subjecting the structure with the tracer to a harsh environment; and
irradiating the tracer with excitation radiation having a first wavelength and detecting resulting photoluminescence emitted by the tracer.

Clause 24. The method of clause 23, wherein the subjecting comprises subjecting the structure to an explosion, and the method further comprises, based at least in part on the detected photoluminescence:
determining mass distribution from the structure due to the explosion;
determining an identity of the structure or a component thereof; or
any combination thereof.

Clause 25. The method of any one of clauses 23-24, wherein each of the first and second protective layers comprises a porous silica shell loaded with water, the silicate suspension comprises sodium metasilicate ($Na_2SiO_3$), or both.

Clause 26. The method of any one of clauses 23-25, wherein during the subjecting to a harsh environment (e.g., explosion):
the porous silica shell of the second protective layer acts as a sacrificial layer to protect the photoluminescent quantum dots therein;
the sodium metasilicate gel absorbs at least some of the energy of the explosion to further protect the photoluminescent quantum dots therein; or
any combination of the above.

Clause 27. The method of any one of clauses 23-26, wherein the subjecting comprises flowing a fluid through the structure, and the method further comprises, based at least in part on the detected photoluminescence, mapping at least part of a flow path for the fluid in or from the structure.

Clause 28. The method of clause 27, wherein:
the flowing the fluid is part of a fracking process,
a temperature of the fluid during the flowing is greater than 75° C,
a pressure of the fluid during the flowing is greater than 50 MPa,
a pH of the fluid is less than or equal to 2, or greater than or equal to 12,
or any combination of the above.

Clause 29. The method of any one of clauses 23-28, wherein for each tracer particle complex:
one of the first and second protective layers is functionalized with an amine-terminated ligand,
the other of the first and second protective layers is functionalized with a thiol-terminated ligand, and
the core is coupled to the photoluminescent substrate via one or more bonds (e.g., chemical bond) between a molecular linker and the amine-terminated and thiol-terminated ligands.

Clause 30. The method of clause 29, wherein the molecular linker comprises an amine-to-sulfhydryl crosslinker (e.g., sulfosuccinimidyl 4-[N-maleimidomethyl] cyclohexane-1-carboxylate (sulfo-SMCC)).

Clause 31. The method of any one of clauses 23-30, wherein each tracer particle complex comprises an agglomeration of multiple cores directly or indirectly coupled to the corresponding photoluminescent substrate.

Clause 32. The method of any one of clauses 23-31, wherein a diameter of each core is about 1 µm or less, a diameter of the agglomeration of multiple cores is greater than 1 µm (e.g., within a range of 1-5 µm), or both.

Clause 33. The method of any one of clauses 23-32, wherein a diameter of each quantum dot is less than or equal to 8 nm (e.g., in a range 1-8 nm, or 1-3 nm), multiple quantum dots are encapsulated by the same second protective layer, or both.

Clause 34. The method of any one of clauses 23-33, wherein the one or more photoluminescent quantum dots comprises a semiconductor material (e.g., one of the Group II-VI semiconductors), the substrate comprises a phosphorescent material, or both.

Clause 35. The method of any one of clauses 23-34, wherein the one or more photoluminescent quantum dots comprises zinc sulfide or cadmium selenide, the substrate comprises doped strontium aluminate, or both.

Clause 36. The method of any one of clauses 23-35, wherein at least some of the cores in the silicate suspension have a diameter different from that of others of the cores in the silicate suspension.

Clause 37. The method of any one of clauses 23-36, wherein at least some of the cores in the silicate suspension have a peak wavelength for photoluminescent emission that is different from that of others of the cores in the silicate suspension.

Clause 38. The method of any one of clauses 23-37, wherein at least some of the substrates in the silicate suspension have a peak wavelength for photoluminescent emission that is different from that of others of the substrates in the silicate suspension.

Clause 39. The method of any one of clauses 23-38, wherein, for each tracer particle complex, the core comprises a first quantum dot covered by a plurality of second quantum dots.

Clause 40. The method of clause 39, wherein each second quantum dot is more stable in air than the first quantum dot, the first quantum dot has a photoluminescent emission intensity greater than that of each second quantum dot, or both.

Clause 41. The method of any one of clauses 39-40, wherein the first quantum dot comprises cadmium selenide, each second quantum dot comprises zinc sulfide, or both.

Clause 42. The method of any one of clauses 39-40, wherein the first quantum dot comprises a metal or semiconductor, each second quantum dot comprises zinc sulfide, or both.

Clause 43. The method of clause 42, wherein the first quantum dot is a gold (Au) quantum dot or a copper (Cu) quantum dot.

Clause 44. The method of any one of clauses 23-43, wherein one, some, or all of the photoluminescent quantum dots are doped.

Clause 45. The method of any one of clauses 23-44, wherein one, some, or all of the photoluminescent substrates are doped.

Clause 46. The method of any one of clauses 44-45, wherein a dopant for the quantum dots and/or substrates comprises terbium (Tb), oxygen (O), manganese (Mn), lead (Pb), samarium (Sm), europium (Eu), copper (Cu), or any combination thereof.

Clause 47. A method of fabricating a tracer, the method comprising:
by a first silication process, forming a first protective layer encapsulating a first photoluminescent substrate;
by a second silication process, forming a second protective layer encapsulating one or more first photoluminescent quantum dots to form a first core;
coupling the first core to the first photoluminescent substrate via the first and second protective layers to form a first tracer particle complex; and
disposing the first tracer particle complex in a silicate suspension.

Clause 48. The method of clause 47, wherein the coupling to form the first tracer particle complex comprises:
functionalizing one of the first and second protective layers with an amine-terminated ligand;
functionalizing the other of the first and second protective layers with a thiol-terminated ligand;
combining a molecular linker with the amine-terminated ligand and the thiol-terminated ligand under conditions effectively to bond (e.g., chemically bond) the molecular linker between the amine-terminated ligand and the thiol-terminated ligand so as to couple the one or more quantum dots within the second protective layer to the first photoluminescent substrate within the first protective layer.

Clause 49. The method of clause 48, wherein:
the molecular linker comprises an amine-to-sulfhydryl crosslinker (e.g., sulfosuccinimidyl 4-[N-maleimidomethyl] cyclohexane-1-carboxylate (sulfo-SMCC)),
the functionalizing the first protective layer comprises exposing the first protective layer to an aminosilane (e.g., 3-aminopropyl trimethoxysilane),
the functionalizing the second protective layer comprises exposing the second protective layer to an organosilane (e.g., 3-mercaptopropyl trimethoxysilane), or
any combination of the above.

Clause 50. The method of any one of clauses 47-48, further comprising, prior to the coupling, repeating the second silication process one or more times so as to form an agglomeration of cores.

Clause 51. The method of any one of clauses 47-50, wherein a diameter of each core is about 1 µm or less, a diameter of the agglomeration of multiple cores is greater than 1 µm (e.g., within a range of 1-5 µm), or both.

Clause 52. The method of any one of clauses 47-51, wherein a diameter of each quantum dot is less than or equal to 8 nm (e.g., in a range 1-8 nm, or 1-3 nm), multiple quantum dots are encapsulated by the same second protective layer, or both.

Clause 53. The method of any one of clauses 47-52, wherein each second silication process comprises disposing the quantum dots in solution with tetraethyl orthosilicate (TEOS).

Clause 54. The method of any one of clauses 47-52, wherein the second silication process comprises disposing the quantum dots in solution, adding a first dose of tetraethyl orthosilicate (TEOS) to the solution at a first time, and adding a second dose of TEOS to the solution at a second time later than the first time.

Clause 55. The method of any one of clauses 53-54, wherein each second silication process further comprises adding a catalyst to the solution with TEOS.

Clause 56. The method of clause 55, wherein the catalyst comprises ammonium hydroxide.

Clause 57. The method of any one of clauses 47-56, wherein the second silication process comprises removing the encapsulated quantum dots at a predetermined time after addition of a catalyst to a solution containing the quantum dots, the predetermined time corresponding to a desired diameter for the core.

Clause 58. The method of clause 57, wherein the solution comprises tetraethyl orthosilicate (TEOS), the catalyst comprises ammonium hydroxide, or both.

Clause 59. The method of clause 58, wherein the TEOS is added to the solution with quantum dots therein prior to addition of the catalyst.

Clause 60. The method of any one of clauses 47-59, further comprising:
  by the first silication process, forming a third protective layer encapsulating a second photoluminescent substrate having a peak wavelength for photoluminescent emission that is different from that of the first photoluminescent substrate;
  by the second silication process, forming a fourth protective layer encapsulating one or more second photoluminescent quantum dots to form a second core, the second photoluminescent quantum dots having a peak wavelength for photoluminescent emission that is different from that of the first photoluminescent substrate;
  coupling the second core to the second photoluminescent substrate via the third and fourth protective layers to form a second tracer particle complex; and
  disposing the second tracer particle complex in the silicate suspension with the first tracer particle complex, or disposing the second tracer particle complex in a different silicate suspension from the first tracer particle complex.

Clause 61. The method of any one of clauses 47-60, further comprising:
  by the first silication process, forming a fifth protective layer encapsulating a third photoluminescent substrate having a peak wavelength for photoluminescent emission that is the same as that of the first photoluminescent substrate;
  by the second silication process, forming a sixth protective layer encapsulating one or more third photoluminescent quantum dots to form a third core, the second photoluminescent quantum dots having a peak wavelength for photoluminescent emission that is different from that of the first photoluminescent substrate;
  coupling the third core to the third photoluminescent substrate via the fifth and sixth protective layers to form a third tracer particle complex; and
  disposing the third tracer particle complex in the silicate suspension with the first tracer particle complex, or disposing the third tracer particle complex in a different silicate suspension from the first or second tracer particle complexes.

Clause 62. The method of any one of clauses 47-61, further comprising:
  by the first silication process, forming a seventh protective layer encapsulating a fourth photoluminescent substrate having a peak wavelength for photoluminescent emission that is different from that of the first photoluminescent substrate;
  by the second silication process, forming an eighth protective layer encapsulating one or more fourth photoluminescent quantum dots to form a fourth core, the fourth photoluminescent quantum dots having a peak wavelength for photoluminescent emission that is the same as that of the first photoluminescent substrate;
  coupling the fourth core to the fourth photoluminescent substrate via the seventh and eight protective layers to form a fourth tracer particle complex; and
  disposing the fourth tracer particle complex in the silicate suspension with the first tracer particle complex, or disposing the fourth tracer particle complex in a different silicate suspension from the first, second, or third tracer particle complexes.

Clause 63. The method of any one of clauses 47-62, further comprising forming the quantum dots prior to forming the respective protective layer.

Clause 64. The method of clause 63, wherein the forming the quantum dots comprises doping the quantum dots.

Clause 65. The method of clause 64, wherein a dopant for the quantum dots comprises terbium (Tb), oxygen (O), manganese (Mn), lead (Pb), samarium (Sm), europium (Eu), copper (Cu), or any combination thereof.

Clause 66. The method of any one of clauses 47-65, wherein each of the first and second protective layers comprises a porous silica shell, the silicate suspension comprises sodium metasilicate ($Na_2SiO_3$), or both.

Clause 67. The method of any one of clauses 47-66, wherein each quantum dot comprises a semiconductor material (e.g., one of the Group II-VI semiconductors), each substrate comprises a phosphorescent material, or both.

Clause 68. The method of any one of clauses 47-68, wherein each quantum dot comprises zinc sulfide or cadmium selenide, each substrate comprises doped strontium aluminate, or both.

CONCLUSION

Any of the features illustrated or described with respect to FIGS. 1A-14, Examples 1-10, and Clauses 1-68 can be combined with any other of FIGS. 1A-14, Examples 1-10, and Clauses 1-68 to provide products, methods, systems, and embodiments not otherwise illustrated or specifically described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope of these claims.

The invention claimed is:

1. A tracer, comprising:
  a silicate suspension having therein a plurality of tracer particle complexes, each tracer particle complex comprising:
    a photoluminescent substrate encapsulated by a first protective layer; and
    a core coupled to the photoluminescent substrate and comprising one or more photoluminescent quantum dots encapsulated by a second protective layer.

2. The tracer of claim 1, wherein each of the first and second protective layers comprises a porous silica shell.

3. The tracer of claim 2, wherein the porous silica shell is loaded with water.

4. The tracer of claim 1, wherein the silicate suspension comprises a gel of sodium metasilicate ($Na_2SiO_3$).

5. The tracer of claim 1, wherein, for each tracer particle complex:
- one of the first and second protective layers is functionalized with an amine-terminated ligand,
- the other of the first and second protective layers is functionalized with a thiol-terminated ligand, and
- the core is coupled to the photoluminescent substrate via one or more bonds between a molecular linker and the amine-terminated and thiol-terminated ligands.

6. The tracer of claim 5, wherein the molecular linker comprises sulfosuccinimidyl 4-[N-maleimidomethyl] cyclohexane-1-carboxylate (sulfo-SMCC).

7. The tracer of claim 1, wherein each tracer particle complex comprises an agglomeration of multiple cores directly or indirectly coupled to the corresponding photoluminescent substrate.

8. The tracer of claim 1, wherein:
- the one or more photoluminescent quantum dots comprises a semiconductor material; or
- the substrate comprises a phosphorescent material; or
- any combination of the above.

9. The tracer of claim 8, wherein:
- the one or more photoluminescent quantum dots comprises zinc sulfide or cadmium selenide;
- the substrate comprises doped strontium aluminate; or
- any combination of the above.

10. The tracer of claim 1, wherein:
- at least some of the cores in the silicate suspension have a diameter different from that of others of the cores in the silicate suspension;
- at least some of the cores in the silicate suspension have a peak wavelength for photoluminescent emission that is different from that of others of the cores in the silicate suspension;
- at least some of the substrates in the silicate suspension have a peak wavelength for photoluminescent emission that is different from that of others of the substrates in the silicate suspension; or
- any combination of the above.

11. The tracer of claim 1, wherein, for each tracer particle complex, the core comprises a first quantum dot surrounded by a plurality of second quantum dots.

12. The tracer of claim 11, wherein:
- the first quantum dot has a photoluminescent emission intensity greater than that of each second quantum dot,
- the first quantum dot comprises cadmium selenide, and
- each second quantum dot comprises zinc sulfide.

13. A method, comprising:
- providing a tracer on or in a structure, the tracer comprising a silicate suspension having therein a plurality of tracer particle complexes, the tracer particle complex comprising:
  - a photoluminescent substrate encapsulated by a first protective layer; and
  - a core coupled to the photoluminescent substrate and comprising one or more photoluminescent quantum dots encapsulated by a second protective layer;
- subjecting the structure with the tracer to a harsh environment; and
- irradiating the tracer with excitation radiation having a first wavelength and detecting resulting photoluminescence emitted by the tracer.

14. The method of claim 13, wherein the subjecting comprises subjecting the structure to an explosion, and the method further comprises, based at least in part on the detected photoluminescence:
- determining mass distribution from the structure due to the explosion; or
- determining an identity of the structure subject to the explosion; or
- any combination thereof.

15. The method of claim 14, wherein each of the first and second protective layers comprises a porous silica shell loaded with water, the silicate suspension comprises a gel of sodium metasilicate ($Na_2SiO_3$), and during the explosion:
- the porous silica shell of the second protective layer acts as a sacrificial layer to protect the photoluminescent quantum dots therein; and
- the sodium metasilicate gel absorbs at least some of the energy of the explosion to further protect the photoluminescent quantum dots therein.

16. The method of claim 13, wherein the subjecting comprises flowing a fluid through the structure, and the method further comprises, based at least in part on the detected photoluminescence:
- mapping at least part of a flow path for the fluid in or from the structure.

17. A method of fabricating a tracer comprising a silicate suspension having therein a plurality of tracer particle complexes, each tracer particle complex comprising:
- a photoluminescent substrate encapsulated by a first protective layer; and
- a core coupled to the photoluminescent substrate and comprising one or more photoluminescent quantum dots encapsulated by a second protective layer, the method comprising:
- by a first silication process, forming the first protective layer encapsulating the photoluminescent substrate;
- by a second silication process, forming the second protective layer encapsulating the one or more photoluminescent quantum dots to form the core;
- coupling the core to the photoluminescent substrate via the first and second protective layers to form a tracer particle complex; and
- disposing the tracer particle complex in a silicate suspension.

18. The method of claim 17, wherein the coupling to form a tracer particle complex comprises:
- functionalizing one of the first and second protective layers with an amine-terminated ligand;
- functionalizing the other of the first and second protective layers with a thiol-terminated ligand; and
- combining a molecular linker with the amine-terminated ligand and the thiol-terminated ligand under conditions effectively to bond the molecular linker between the amine-terminated ligand and the thiol-terminated ligand, so as to couple the one or more quantum dots within the second protective layer to the photoluminescent substrate within the first protective layer.

19. The method of claim 18, wherein the molecular linker comprises sulfosuccinimidyl 4-[N-maleimidomethyl] cyclohexane-1-carboxylate (sulfo-SMCC).

20. The method of claim 17, further comprising, prior to the coupling, repeating the second silication process one or more times so as to form an agglomeration of cores.

* * * * *

UNITED STATES PATENT AND TRADEMARK OFFICE
CERTIFICATE OF CORRECTION

| | | |
|---|---|---|
| PATENT NO. | : 12,077,698 B2 | |
| APPLICATION NO. | : 17/153178 | |
| DATED | : September 3, 2024 | |
| INVENTOR(S) | : Hubbard et al. | |

It is certified that error appears in the above-identified patent and that said Letters Patent is hereby corrected as shown below:

In the Specification

Column 20, Line 10 "in a tracer particle complexes" should read --in tracer particle complexes--

Column 22, Line 22 "with a silica shells" should read --with silica shells--

Column 24, Line 3 "was vortex for" should read --was vortexed for--

Signed and Sealed this
Seventeenth Day of December, 2024

Derrick Brent
*Acting Director of the United States Patent and Trademark Office*